United States Patent [19]

Ferguson et al.

[11] Patent Number: 5,596,725
[45] Date of Patent: Jan. 21, 1997

[54] FIFO QUEUE HAVING REPLACEABLE ENTRIES

[75] Inventors: Patrick L. Ferguson, Houston; David J. Maguire, Spring, both of Tex.

[73] Assignee: Compaq Computer Corporation, Houston, Tex.

[21] Appl. No.: 196,586

[22] Filed: Feb. 14, 1994

[51] Int. Cl.⁶ ........................................... G06F 13/00
[52] U.S. Cl. ................ 395/250; 364/238; 364/238.6; 364/239; 364/239.6; 364/DIG. 1
[58] Field of Search ..................................... 395/250, 325, 395/309, 310

[56] References Cited

U.S. PATENT DOCUMENTS

| 4,388,687 | 6/1983 | Twibell et al. | |
| 4,939,720 | 7/1990 | Bakka | 370/60 |
| 5,046,000 | 9/1991 | Hsu | 395/250 |
| 5,327,422 | 7/1994 | Abexelt et al. | 370/63 |

FOREIGN PATENT DOCUMENTS 0379709  8/1990  European Pat. Off. .

Primary Examiner—Kevin J. Teska
Assistant Examiner—Ayni Mohamed
Attorney, Agent, or Firm—Pravel, Hewitt, Kimball & Krieger

[57] ABSTRACT

A FIFO queue is utilized to provide control information to the appropriate time slot in a time multiplexed serial link between an interface chip and a CODEC. The FIFO queue allows rewriting or replacement of any control registers present in the queue without requiring that a new entry be placed in the queue. A particular control register which is placed in the queue then maintains its place as the queue is emptied, even though the control register may be written one or more times while the control register entry is in the queue waiting for transmission to the CODEC. The loss of the prior command information is not a problem as the data rate of the serial link is still sufficiently high so that any minor transitory change which may have been desired would be of minimal effect in any regard and would have been inaudible to the human.

9 Claims, 16 Drawing Sheets

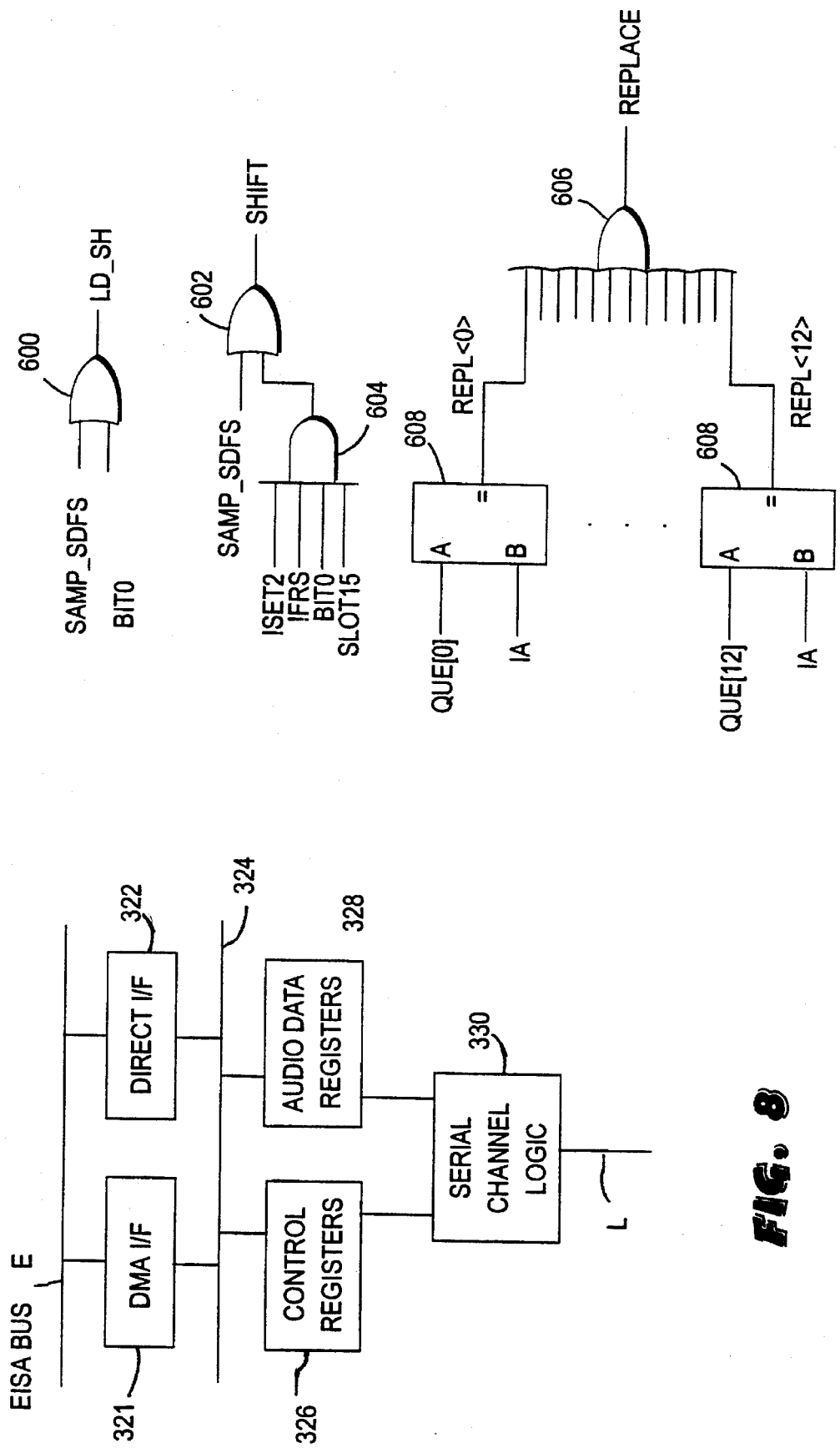

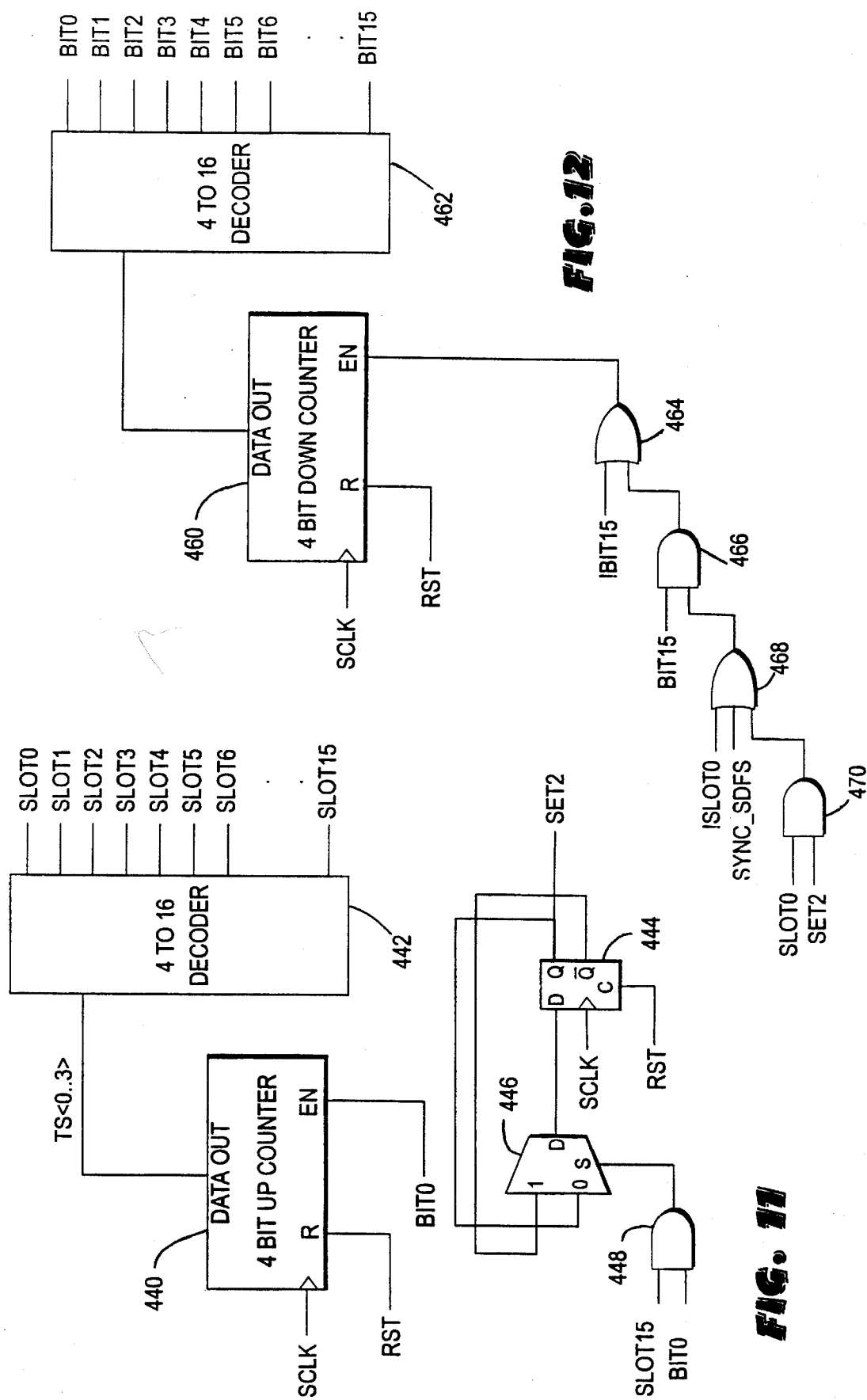

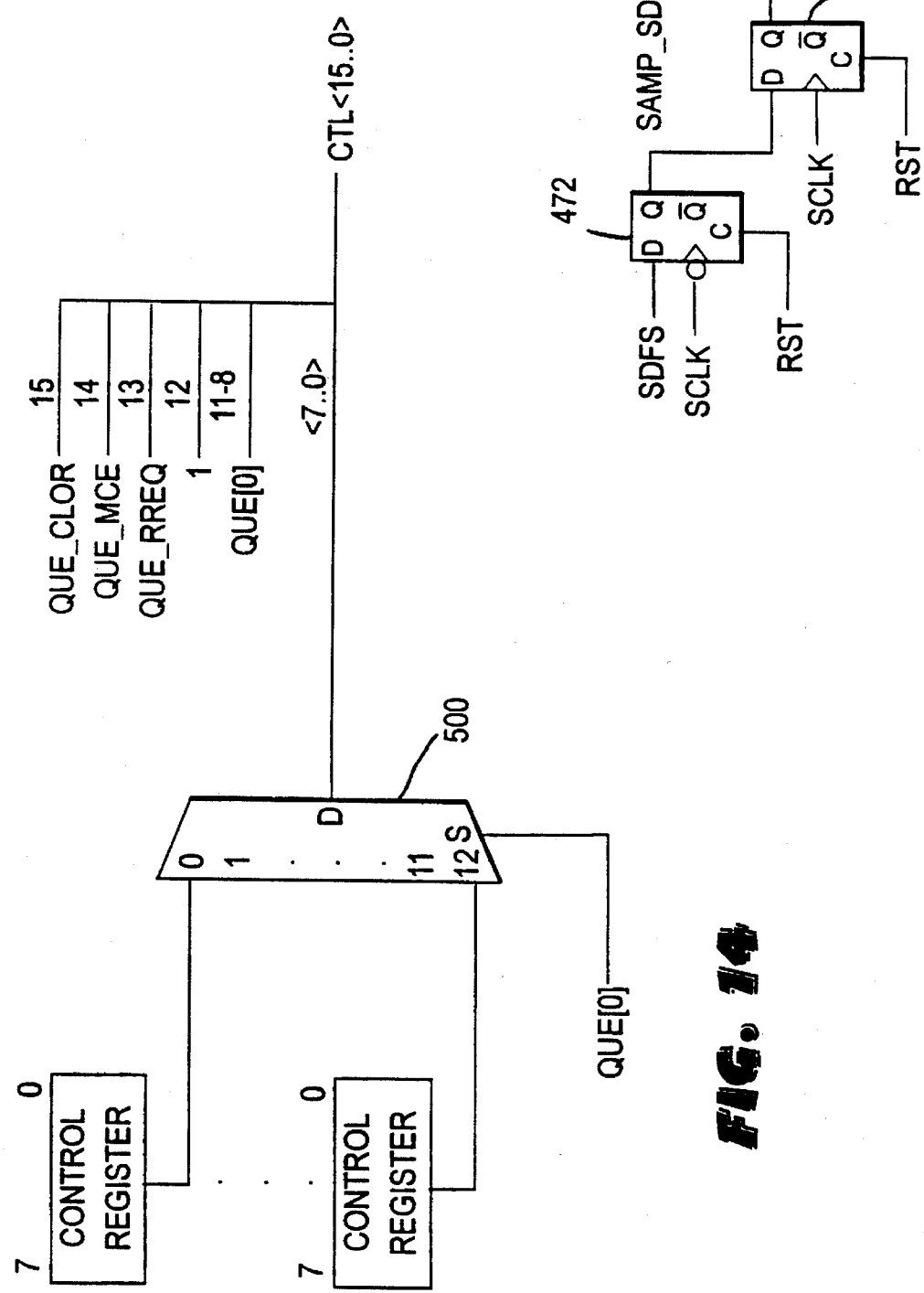

FIFO QUEUE HAVING REPLACEABLE ENTRIES

BACKGROUND OF THE INVENTION

1. Field of the Invention

The invention relates to FIFO queues used to pass information between two devices, and more particularly to a FIFO queue where entries in the queue can be replaced without reordering the queue.

2. Description of the Related Art

As current computer systems become more and more complicated, one trend is that more and more functions are being placed onto a single chip. However, one resulting problem limiting this integration is the number of pins needed on the chips. An increase in the pin count increases the costs of the chip and beyond certain pin count levels manufacturing both the chip and the circuit board becomes very complicated and thus expensive. Therefore it is desirable to reduce the number of pins on the chip. This leads to a trade off between function integration and cost.

Part of the pin count problem derives from the fact that the most common interfaces in computer systems are done in a parallel manner because of speed considerations. Addresses and data are provided in a parallel manner so that higher bandwidths can be obtained for a given clock rate. While serial links have been considered in some cases, one of the problems in general with a serial link is that it is often significantly slower than an equivalent parallel interface. For a given clock speed the serial link is at least N times slower, where N is the number of bits which must be transferred across the serial link to provide the same information which would be provided at one time is a parallel interface. This reduced data rate has limited the number of applications of serial links inside computer systems, so that even though they may have certain pin count advantages, the performance disadvantages limit their uses.

A further problem arises when interfacing between two devices, one that is higher speed and one that is lower speed. In this case it is very common to use a first in/first out (FIFO) queue to compensate for the differences between the data rates. FIFO queue logic is relatively conventional and will handle most situations where the higher speed device provides data in a burst fashion and can be held off when the FIFO queue is full, but conventional FIFO logic cannot handle the situation where the higher speed device cannot readily be held off, do that the FIFO queue would be readily overrun in those cases.

Another ongoing development in computer systems is the increasing use of audio, particularly high quality audio. This requires the use of a CODEC chip in the computer to perform the necessary digital and analog conversions. One characteristic of the CODEC chips is that quite often they have a number of control registers used to control their operation, which control registers it is desirable to read and write at a very high rate, as compared to the relatively slow data rates of audio data. It may take a relatively large number of control register operations to provide mode changes and these changes are often performed at a very high rate by the controlling processor. While this high rate of control versus the low data rate for the actual audio data is not a problem when a parallel interface is used, if a time multiplexed serial link is used, which is commonly utilized in digital signal processors (DSP) which are used to perform significant audio filtering and other operations, then a problem develops because the available effective transfer rate for the control registers is greatly reduced. In such a serial link control register information is often passed only in a single or very limited number of time slots in a serial fashion. This effectively slows down the maximum actual data transfer rate of the control information to that of the frame rate of the serial link.

When the device having the time multiplexed serial link is also connected to a bus of a much higher speed, such as one of the parallel busses present in the computer system to receive control information from the system microprocessor, it is quite possible to overrun the operations to the control registers in relation to the effective speed of the serial link. This is contrasted with the requirements of the audio where a relatively slow data transfer rate can be used to help reduce costs of the various components.

Therefore, it would be desirable to develop a structure which could balance the use of a time multiplexed serial channel to a CODEC with the need to rapidly provide the control information which is necessary for operation of the CODEC without greatly increasing costs of the components.

SUMMARY OF THE PRESENT INVENTION

In a computer system according to the present invention, a FIFO queue is utilized to provide control information to the appropriate time slot in a time multiplexed serial link between an interface chip and a CODEC. The FIFO queue allows rewriting or replacement of any control registers present in the queue without requiring that a new entry be placed in the queue. A particular control register which is placed in the queue then maintains its place as the queue is emptied, even though the control register may be written one or more times while the control register entry is in the queue waiting for transmission to the CODEC. In this manner it is possible to absorb numerous control register operations to a particular register without filling the queue or requiring a higher data rate on the serial link. The loss of the prior command information is not a problem as the data rate of the serial link is still sufficiently high so that any minor transitory change which may have been desired would be of minimal effect in any regard and would have been inaudible to the human. Therefore, by allowing the replacement of control register entries already present in the FIFO queue, the effective data transfer rate of the control information is increased without producing an audible difference. This allows the use of a slower time multiplexed serial link and a connection to a higher speed data bus while utilizing more inexpensive technology to save costs.

BRIEF DESCRIPTION OF THE DRAWINGS

A better understanding of the present invention can be obtained when the following detailed description of the preferred embodiment is considered in conjunction with the following drawings, in which:

FIG. 8 is a block diagram of the audio interface portions of the miscellaneous system logic chip of FIG. 1;

FIG. 11 is a schematic diagram of the time slot logic;

FIG. 12 is a schematic diagram of the bit timing logic for each time slot;

FIG. 13 is a schematic diagram of the circuitry utilized with the bit counter of FIG. 12;

FIG. 14 is a block diagram of the control logic to provide information to the control channel input of the multiplexer of FIG. 9;

FIGS. 16, 17, 18, 19 and 20 are schematic diagrams of logic circuitry associated with the queue control logic of FIG. 15.

DETAILED DESCRIPTION OF PREFERRED EMBODIMENT

Figure 1:
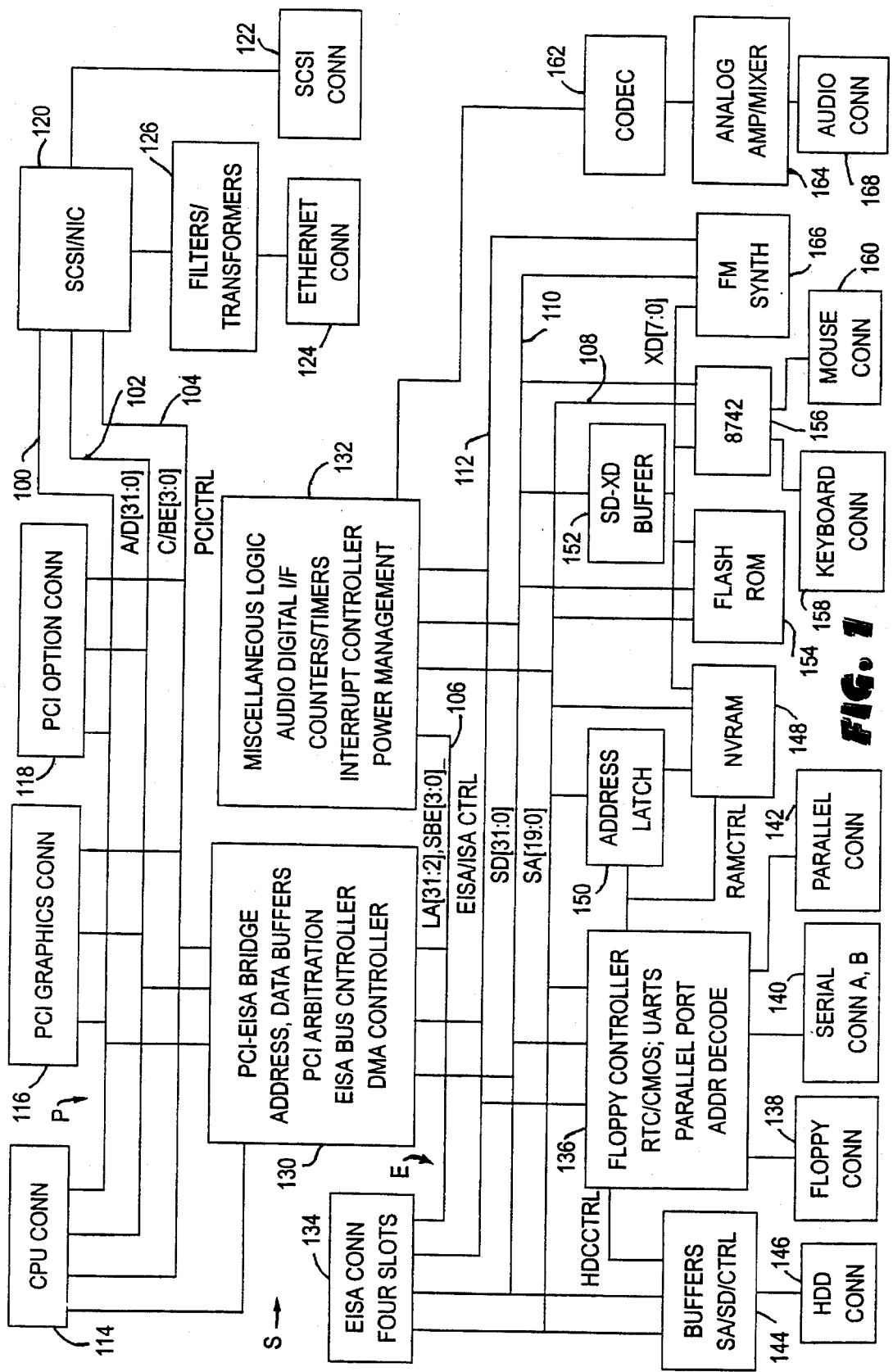
FIG. 1 is a block diagram of a system board including an arbiter according to the present invention.

Referring now to FIG. 1, the system board S of a computer system according to the present invention is shown. In the preferred embodiment, the system board contains circuitry and slots for receiving interchangeable circuit boards. In the preferred embodiment, there are two primary buses located on the system board S. The first bus is the PCI or Peripheral Component Interconnect bus P which includes address/data portion 100, control and byte enable portion 102 and control signal portion 104. The second primary bus on the system board S is the EISA bus E. The EISA bus E includes LA address portion 106, SA address portion 108, SD data portion 110 and EISA/ISA control signal portion 112. The PCI and EISA buses P and E form the backbones of the system board S.

Figure 2A:
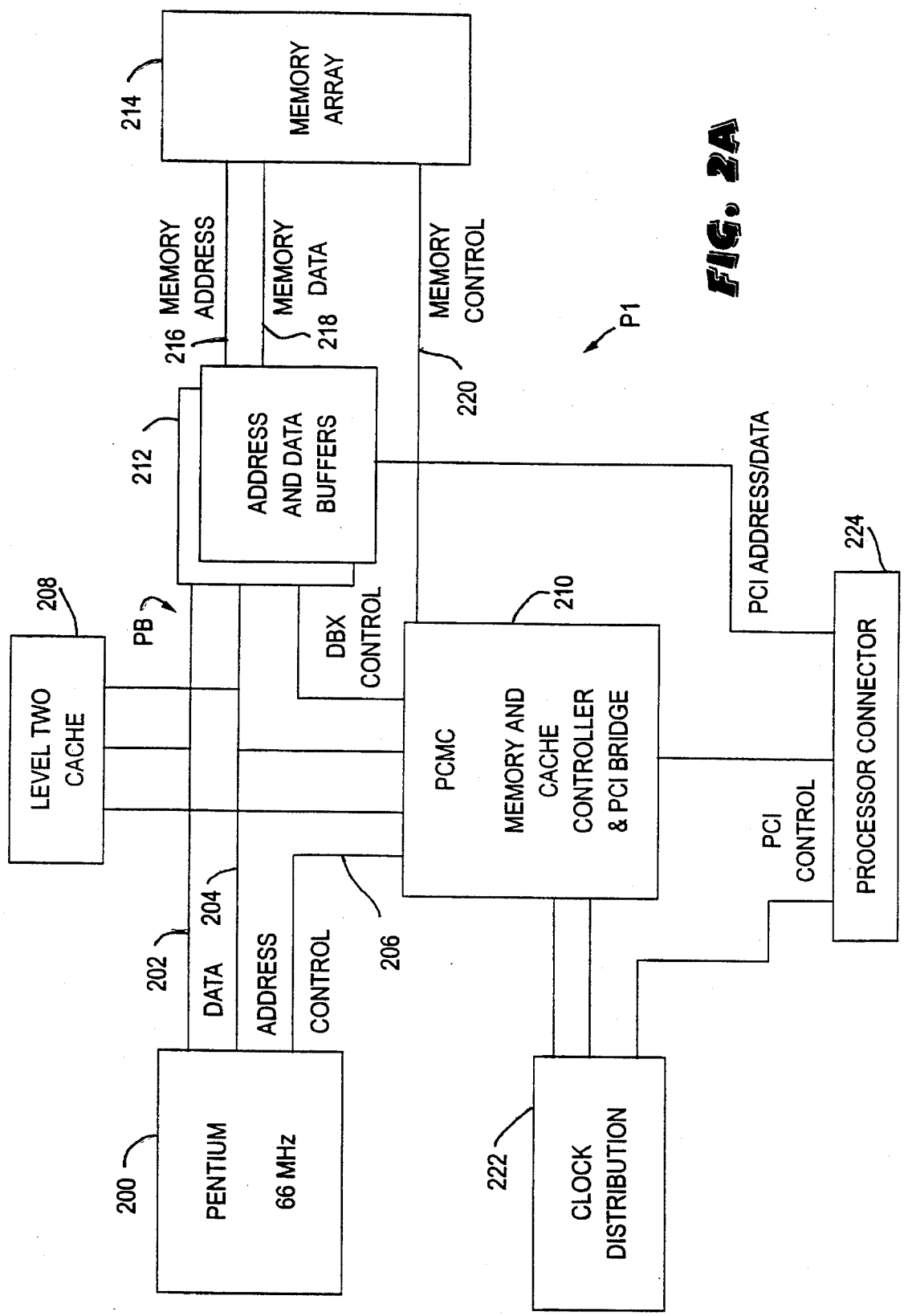
FIGS. 2A and 2B are block diagrams of alternate processor boards for use with the system board of FIG. 1.
Figure 2B:
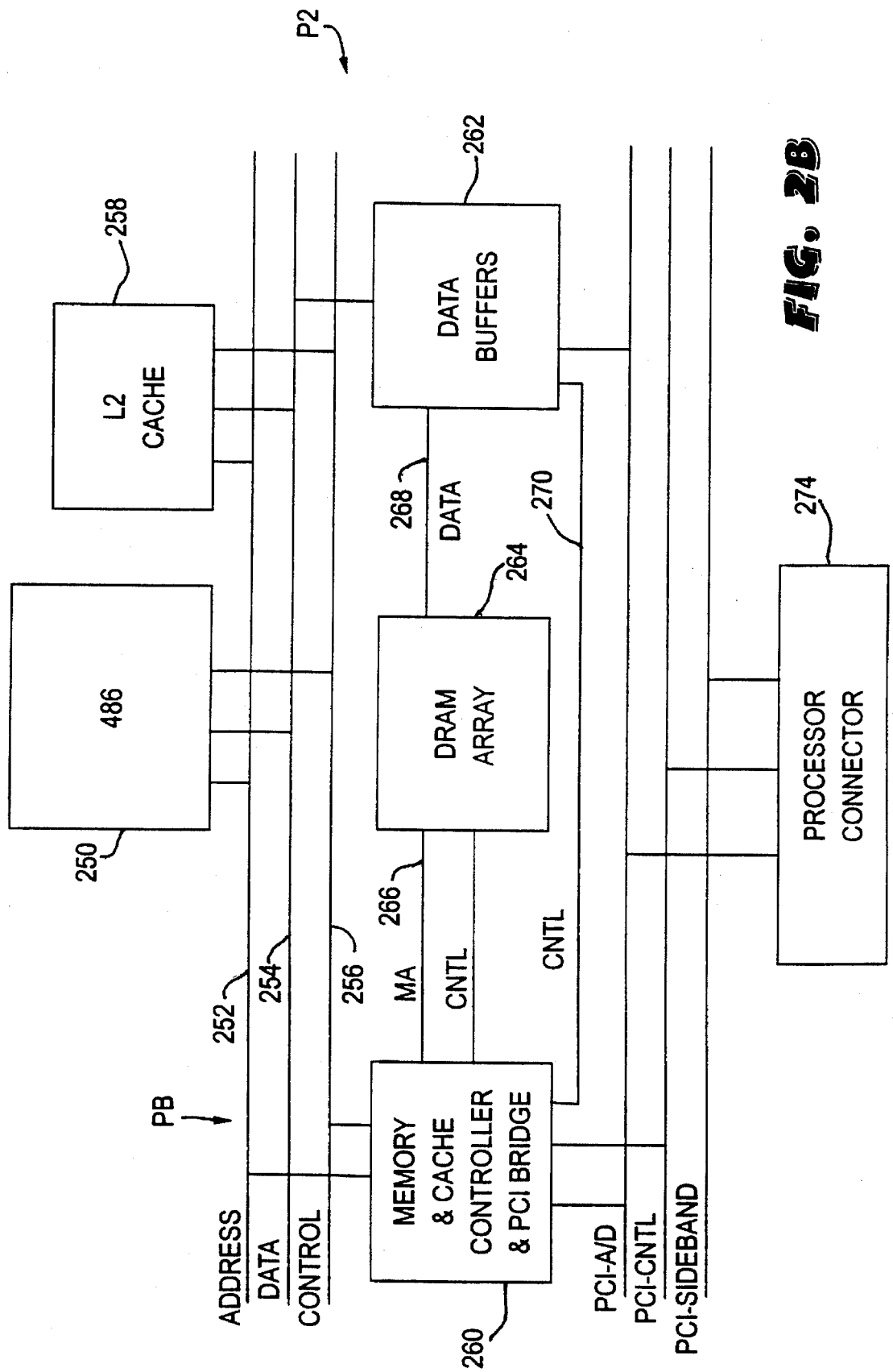
Figure 3:
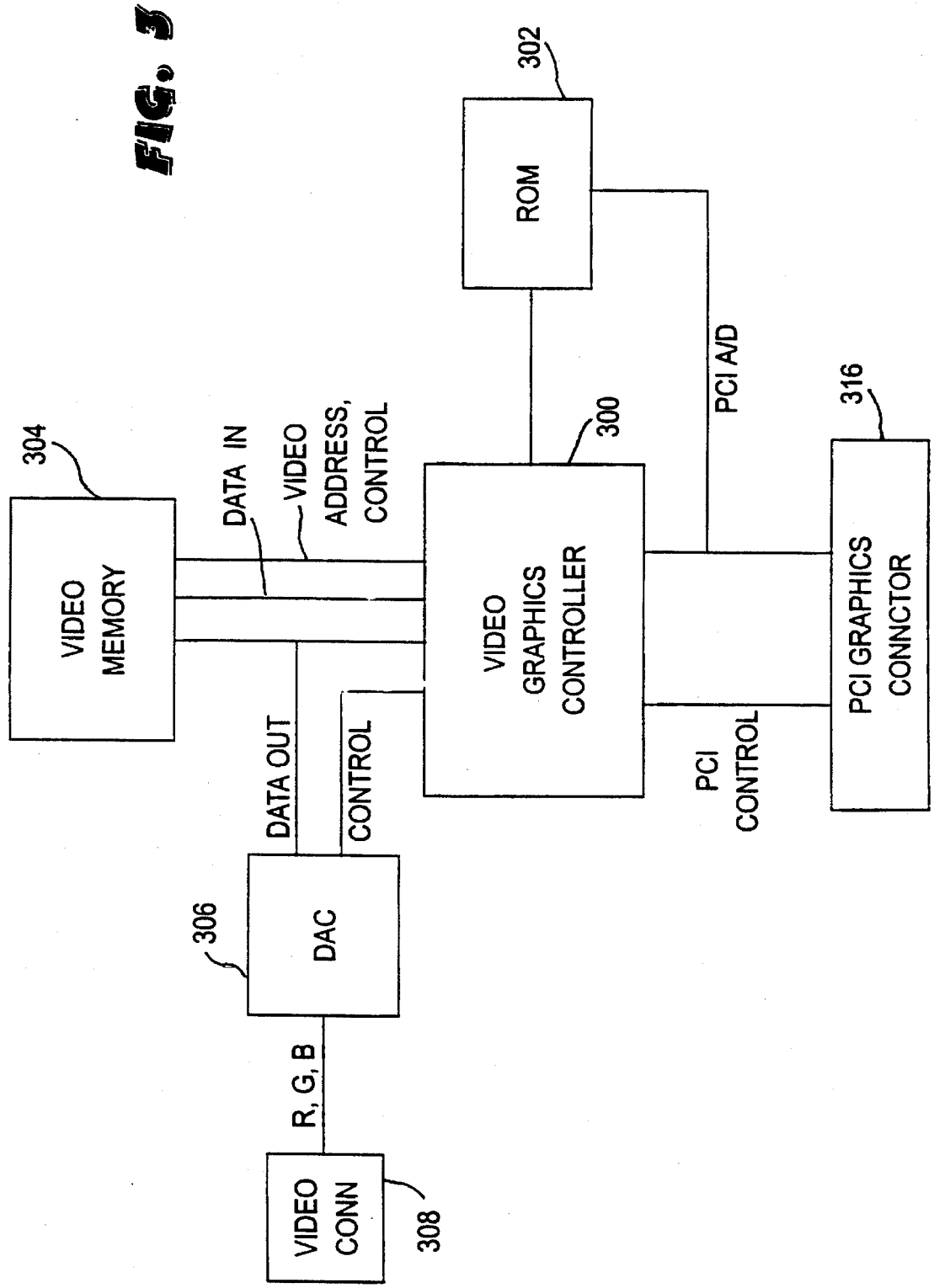
FIG. 3 is a block diagram of a video graphics controller board for use with the system board of FIG. 1.

A CPU connector 114 is connected to the PCI bus P to receive interchangeable processor cards, such as those shown in FIGS. 2A and 2B. A PCI graphics connector 116 is connected to the PCI bus P to receive a video graphics card as shown in FIG. 3. A PCI option connector 118 is also connected to the PCI bus P to receive any additional cards designed according to the PCI standard. In addition, a SCSI and network interface (NIC) controller 120 is connected to the PCI bus P. Preferably the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system boards and computer to a local area network (LAN).

A PCI-EISA bridge 130 is provided to convert signals between the PCI bus P and the EISA bus E. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus E. The miscellaneous system logic chip 132 contains a digital audio interface, counters and timers as conventionally present in personal computer systems, an interrupt controller for both the PCI and EISA buses P and E and power management logic, as well as other miscellaneous circuitry. A series of four EISA slots 134 are connected to the EISA bus E to receive ISA and EISA adapter cards. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus E and the combination I/O chip 136 to act as a buffer between the EISA bus E and a hard disk drive connector 146 to allow connection of an IDE-type hard disk drive. A non-volatile random access memory (NVRAM) 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information. A data buffer 152 is connected to the SD portion of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus E and is controlled by the miscellaneous system logic chip 132. An audio connector 168 is provided to allow external audio connections to the computer and is connected to the outputs and inputs of the analog amplifier and mixer 164. The interconnection details are further detailed in FIG. 4 described below.

Referring now to FIGS. 2A and 2B, alternate processor board designs are shown. In the processor board P1 of FIG. 2A, the CPU or processor 200 is the Pentium processor from Intel, preferably operating at 66 MHz. The processor 200 provides data, address and control portions 202, 204 and 206 to form a processor bus PB. A level 2 (L2) or external cache memory system 208 is connected to the processor bus PB to provide additional caching capabilities to improve performance of the computer system. A processor cache and memory controller (PCMC) and PCI bridge chip 210, such as the 82434LX chip from Intel Corporation is connected to the control portion 206 and to the address portion 204. The PCMC 210 is connected to the L2 cache 208 as it incorporates the cache controller and therefore controls the operations of the cache memory devices in the L2 cache 208. The PCMC 210 is also connected to control a series of address and data buffers 212. The address and data buffers 212 are preferably the 82433LX from Intel and are utilized to handle memory addressing and memory data to a main memory array 214. The address and data buffers 212 are connected to the processor data portion 202 and processor address portion 204 and receive control signals from the PCMC 210. The address and data buffers 212 provide a memory address bus 216 and a memory data bus 218 to the memory array 214. A memory control signal bus 220 is provided from the PCMC 210. Clock distribution and generation circuitry 222 is associated with the processor card P1 and is connected to the PCMC 210. A processor connector 224, such as a card edge, is provided to be mateably received by the processor connector 114. The processor connector 224 is connected to the PCMC 210, the address and data buffers 212 and the clock distribution circuitry 222 to provide clocks to the computer system and to provide a PCI interface to allow the processor 200 to access the PCI and EISA buses P and E and to allow PCI and EISA bus masters to access the main memory array 214.

Referring now to FIG. 2B, an alternate processor card P2 is shown. In the processor card P2, the processor 250 is preferably a 486 class processor, such as the 486 S-class processors. Again, address, data and control portions 252, 254 and 256 are developed from the processor 250 to form a processor bus PB. An L2 cache memory 258 is connected to the processor bus PB, while a cache and memory controller and PCI bridge chip (CDC) 260, such as the 82424TX or 82424ZX from Intel, is also connected to the processor bus PB. The CDC 260 controls the operations of the L2 cache 258, as similarly performed in processor card P1 by the PCMC 210. A main memory array 264 receives its address information directly from the CDC 260, as well as its control signals. Data buffers 262, preferably the 2423TX from Intel, are connected between the processor data portion 254 and a data bus 268 to the memory array 264. The data buffers 262 are controlled by the CDC 260. Again, a processor connector 274 is provided to be mateably received with the processor connector 114. The CDC 260 is connected to the processor connector 274, as are the data buffers 262.

Referring now to FIG. 3, an exemplary video graphics adapter is shown. A video graphics controller 300 is connected to a PCI graphics connector 316, which is mateably received in the graphics connector 116. A ROM 302 is connected to the graphics connector 316 and receives control signals from the video graphics controller 300. Video memory 304 is used to store the graphics data and is connected to the video graphics controller 300 and a digital/analog converter (DAC) 306. The video graphics controller 300 controls the operation of the video memory 304, allowing data to be written and retrieved as required. A video connector 308 is connected to the DAC 306. A monitor (not shown) is connected to the video connector 308.

It is noted that the above-description of a computer system is provided for completeness and numerous variations could be developed as apparent to those skilled in the art.

Figure 4:
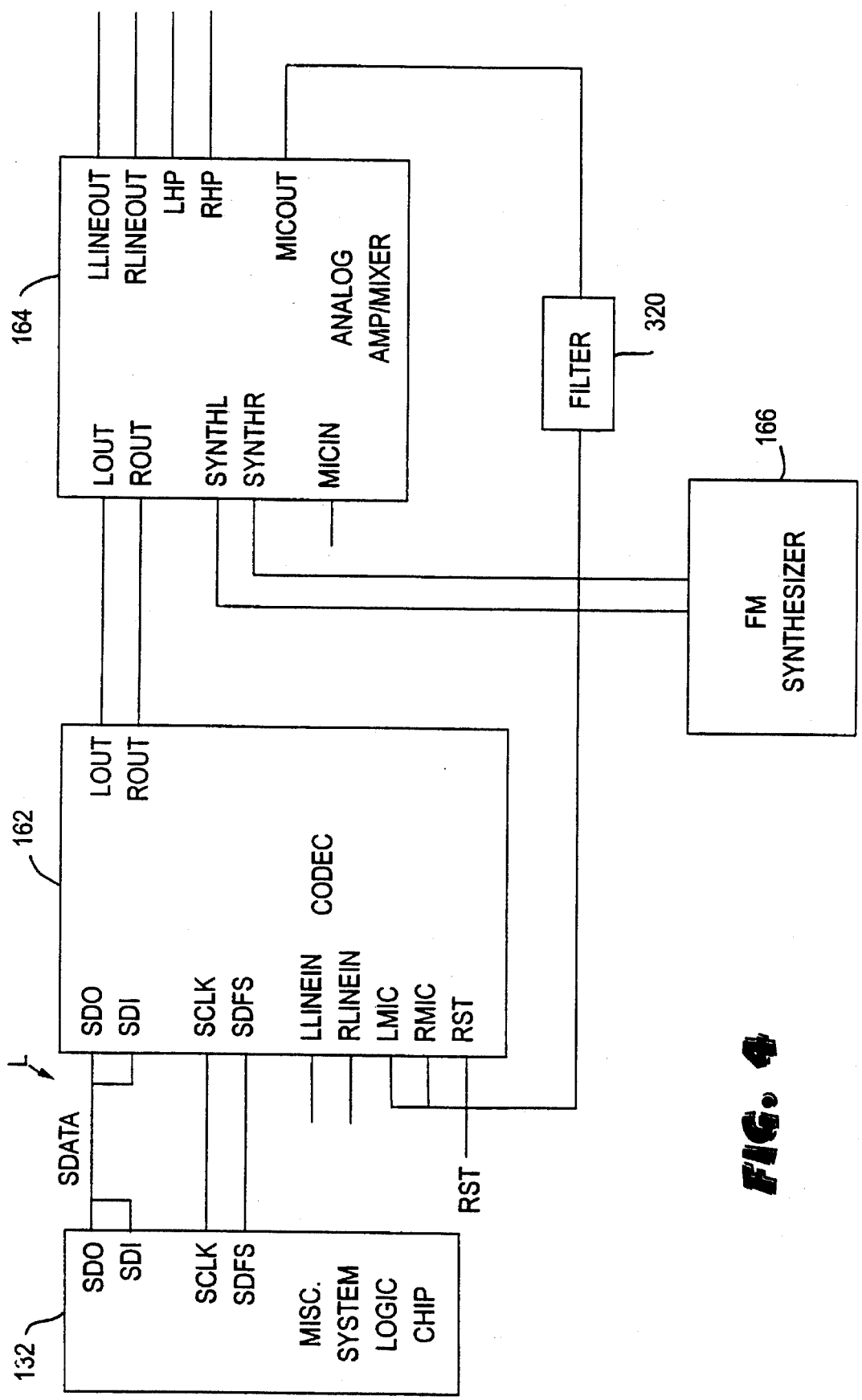
FIG. 4 is a more detailed block diagram illustrating the CODEC of FIG. 1 and its interconnected components.

Referring now to FIG. 4 a more detailed block diagram of the connections between the miscellaneous system logic chip 132, the CODEC 162, the analog amp/mixer 164 and the FM synthesizer 166 is shown. The miscellaneous system logic chip 132 has four related pins which form the serial link L between the chip 132 and the CODEC 162. First is the SCLK or serial clock pin, while the second is the SDFS or serial data frame synchronization signal. The next two pins are the SDO or serial data out and SDI or serial data in pins. The SDO and SDI pins are connected together to develop the SDATA or serial data signal. The signals are connected to their counterparts on the CODEC 162.

The CODEC 162 provides the SCLK and SDFS signals as it controls the timing of the serial link L. Preferably the SCLK signal has a frequency of 12.288 or 11.2896 MHz. The CODEC 162 is preferably the AD1847 from Analog Devices, which is a modification of the AD1848 from Analog Devices, which is a parallel bus version of the CODEC 162. The difference between the two devices is the conversion to allow the use of a serial link such as the time multiplexed links conventionally utilized with DSP chips. The CODEC 162 receives LLINEIN and RLINEIN or left line level and right line level audio signals and receives a microphone signal from a filter 320 into the LMIC and RMIC inputs, that is the left and right microphone inputs. The CODEC 162 provides analog LOUT and ROUT or left and right channel outputs to the analog amp/mixer 164. The analog amp/mixer 164 receives SYNTHL and SNYTHR or synthesizer left and right signals from the FM synthesizer 166. Further, the analog amp/mixer 164 receives a MICIN signal, from an external microphone (not shown). The analog amp/mixer 164 provides the LLINEOUT and RLINEOUT or left and right line level output signals which are provided to external jacks (not shown) to receive conventional connectors. The analog amp/mixer 164 provides the LHP and RHP or left headphone and right headphone signals for use with external headphones (not shown). Further, the analog amp/mixer 164 provides a MICOUT signal to the filter 320. The analog amp/mixer 164 provides amplification and mixing circuits to amplify the various received signals to acceptable levels. More details on the analog amp/mixer 164 are provided in application Ser. No. 08/145,752, filed Oct. 29, 1993 and entitled "Combined Headphone and Internal Speaker Amplifier and Switch Circuit for a Computer System," which is hereby incorporated by references.

Figures 5, 7:
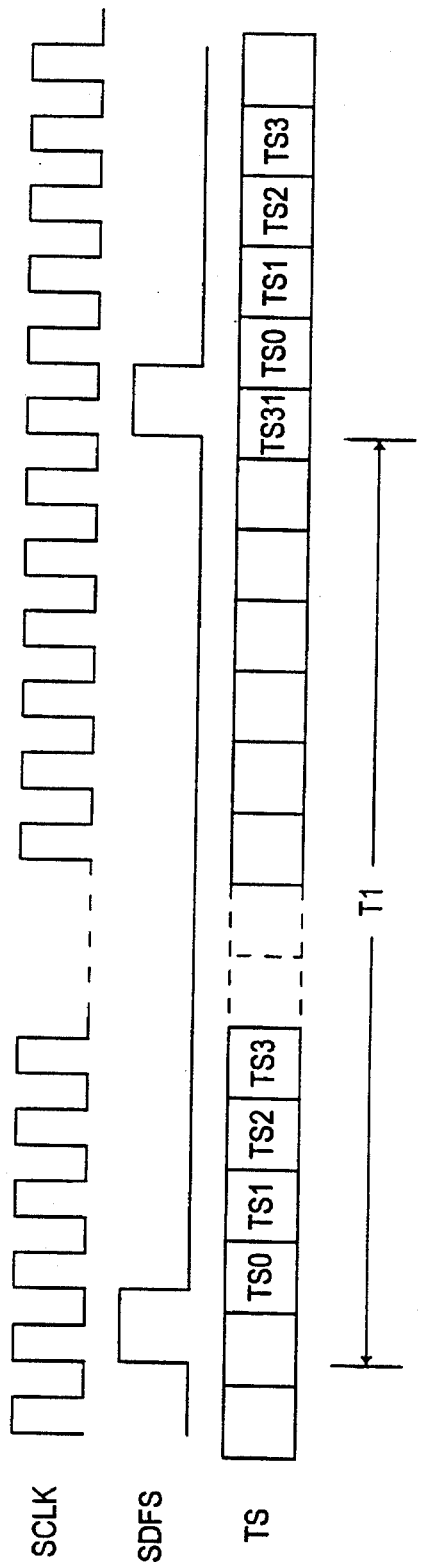
FIG. 5 is a timing diagram illustrating the time multiplexed characteristics of the serial link between the miscellaneous system logic chip and the CODEC of FIG. 1.
FIG. 7 is a diagram indicating the meaning of the various bits in the control word provided in time slot 0 of FIG. 6.

The time multiplexed format of the serial link L between the miscellaneous system logic chip 132 and the CODEC 162 is shown in FIG. 5. The SDFS signal is used to indicate the start of a frame, with the frame having either 16 or 32 time slots. Preferably the SDFS signal is asserted for one SCLK signal period. Each time slot consists of a 16 bits of information, with the individual data bits being transferred based on the SCLK signal. The SCLK signal is not illustrated to scale in FIG. 5. Data is provided to the respective serial data output on the rising edge of the SCLK signal and is latched by the serial data input on the falling edge of the SCLK signal.

Figure 6:
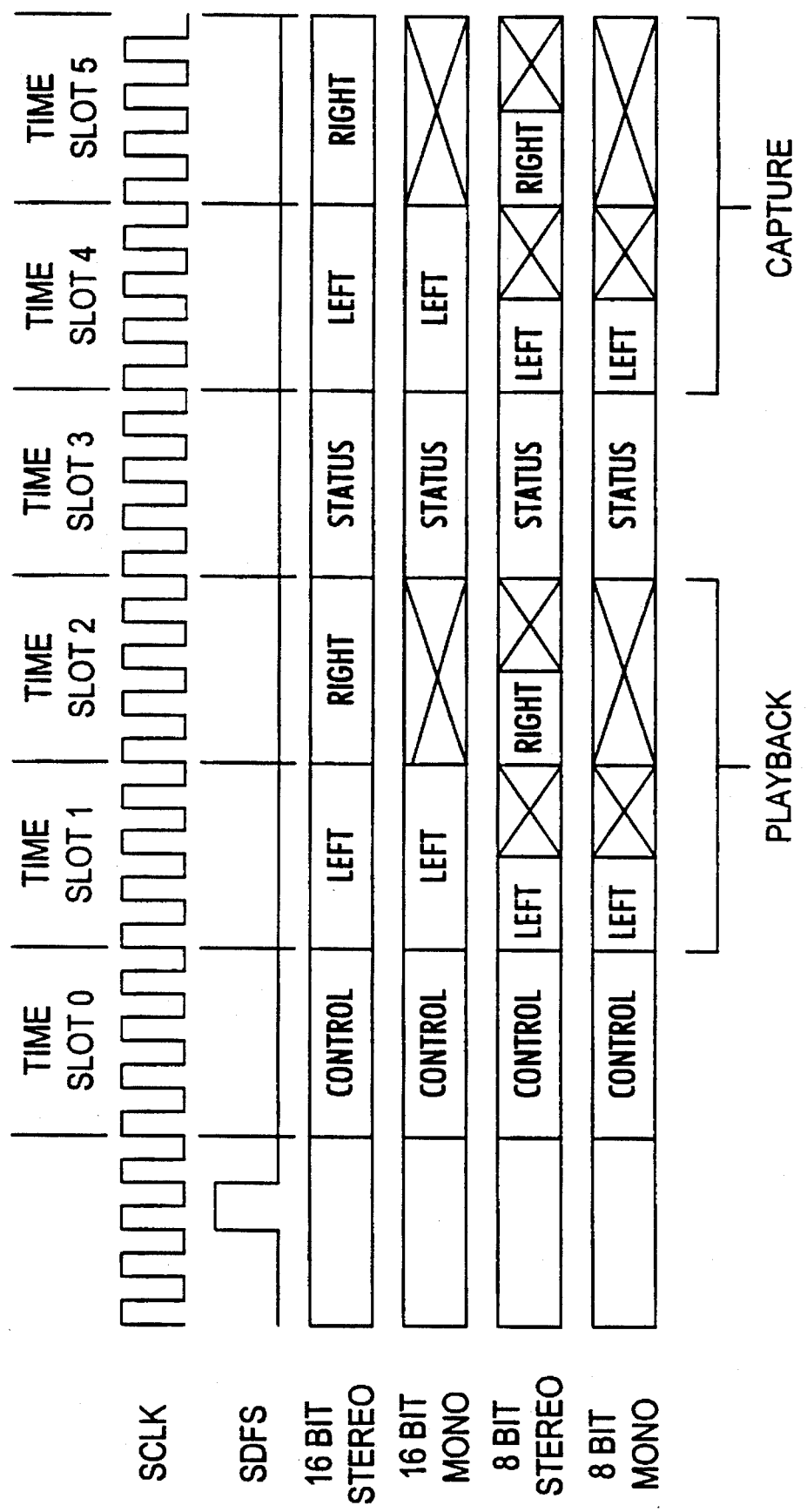
FIG. 6 is a timing diagram indicating in more detail the breakdown of the particular time slots in the timing diagram of FIG. 5 in several modes.

FIG. 6 provides more details on the particular time slots and the information provided for various audio modes. In the preferred embodiment only six time slots are actually utilized in the communication between the miscellaneous system logic chip 132 and the CODEC 162, thereby allowing expansion as the capabilities of the devices increase and more functions are assigned to them. The CODEC 162 is operable in four modes, 16 bit stereo and mono and 8 bit stereo and mono, with these alternative modes being illustrated in FIG. 6. As indicated, time slot 0 in all four cases is used to pass control information from the system logic chip 132 to the CODEC 162. This control information is used to address particular control registers located in the CODEC 162 and to perform certain functions as will be explained below. Time slot 1 is used to provide the left channel playback information from the system logic chip 132 to the CODEC 162, while time slot 2 is utilized to provide right channel information when stereo modes are utilized. Time slot 3 is utilized for providing the status information return from the CODEC 162 to the system logic chip 132. Time slot 4 is utilized for left channel data being captured by the CODEC 162 and being transmitted to the system logic chip 132, and time slot 5 is used for right channel captured data when stereo modes are being utilized. The remaining ten or twenty-six time slots are not illustrated in FIG. 6 as in the preferred embodiment no information is contained in those time slots. Again the SCLK signal is not shown to scale.

FIG. 7 illustrates the breakdown of the bits in the control word provided in time slot 0. The most significant bit is the CLOR or clear overrange bit. The CODEC 162 can overrange or effectively saturate upon receipt of certain values, in which case overrange error bits are set. The use of the CLOR bit in a control word clears those respective status bits. The next most significant bit is the MCE or master control enable bit. Two particular control registers in the CODEC 162 are utilized to control data format and interface configuration information and preferably these registers are locked during normal operation so that the configuration and format cannot accidentally be changed. However, when the MCE bit is set, these two particular control registers can be altered to allow operation and the outputs of the CODEC 162 are muted. The next most significant bit is the RREQ or register read request bit. This bit is set when a particular internal register in the CODEC 162 is to be read. It is not used during normal operations but is provided for diagnostic access. This function is utilized when the FIFO queue is empty. The selected requested information is provided in the status return word from the CODEC 162 instead of the conventional status information.

The MCE bit is provided to the system logic chip 132 in an access to any control register in the system logic chip 132. The various control registers are accessed by use of an indexed address port and an indexed data port. As only five bits of address information are used in the preferred embodiment, the MCE bit is provided as one of the bits in the remainder of the indexed address port. The CLOR and RREQ bits are contained in a particular control register but are provided with each control word in time slot 0. Because the MCE bit is provided in a different manner and all must be provided with each control word, special logic is provided for them.

The four least significant bits of the upper byte of the control word are the particular indexed address value for the control register in the CODEC 162 which is to be addressed by this particular control word. The lower byte provides the data to the particular control register being addressed.

FIG. 8 is a block diagram of the audio digital interface section of the miscellaneous system logic chip 132. A DMA interface 321 and a direct register interface 322 are connected to the EISA bus E and to an internal data bus 324 in the miscellaneous system logic chip. A plurality of control registers 326 are connected to the internal data bus 324, as are the audio data registers 328. Preferably, there are thirteen registers in the control section for allowing control of the left and right line inputs, the left and right auxiliary inputs, the left and right outputs, the data format and interface configuration, the state of particular digital pin control, miscellaneous information and the loopback state of the CODEC 162. These registers are present in the miscellaneous system logic 132 in a double buffered format to allow synchronization between the EISA bus E and the serial link L. The same control registers 328 are generally present in the CODEC 162, so that writing to a register in the system logic chip 132 effectively causes the same register in CODEC 162 to receive the same value due to the serial link L operation. This operation is detailed below. Some minor differences in the registers may exist, but they are not relevant to this description and have been omitted for clarity.

The audio data registers 328 preferably include left and right data playback and capture registers to allow bidirectional transfer of audio information. The control registers 326 and the audio data registers 328 are connected to serial channel logic 330 which receives the SCLK, SDATA and SDFS signals. The serial channel logic 330 is described in more detail in the following figures.

Figure 9:
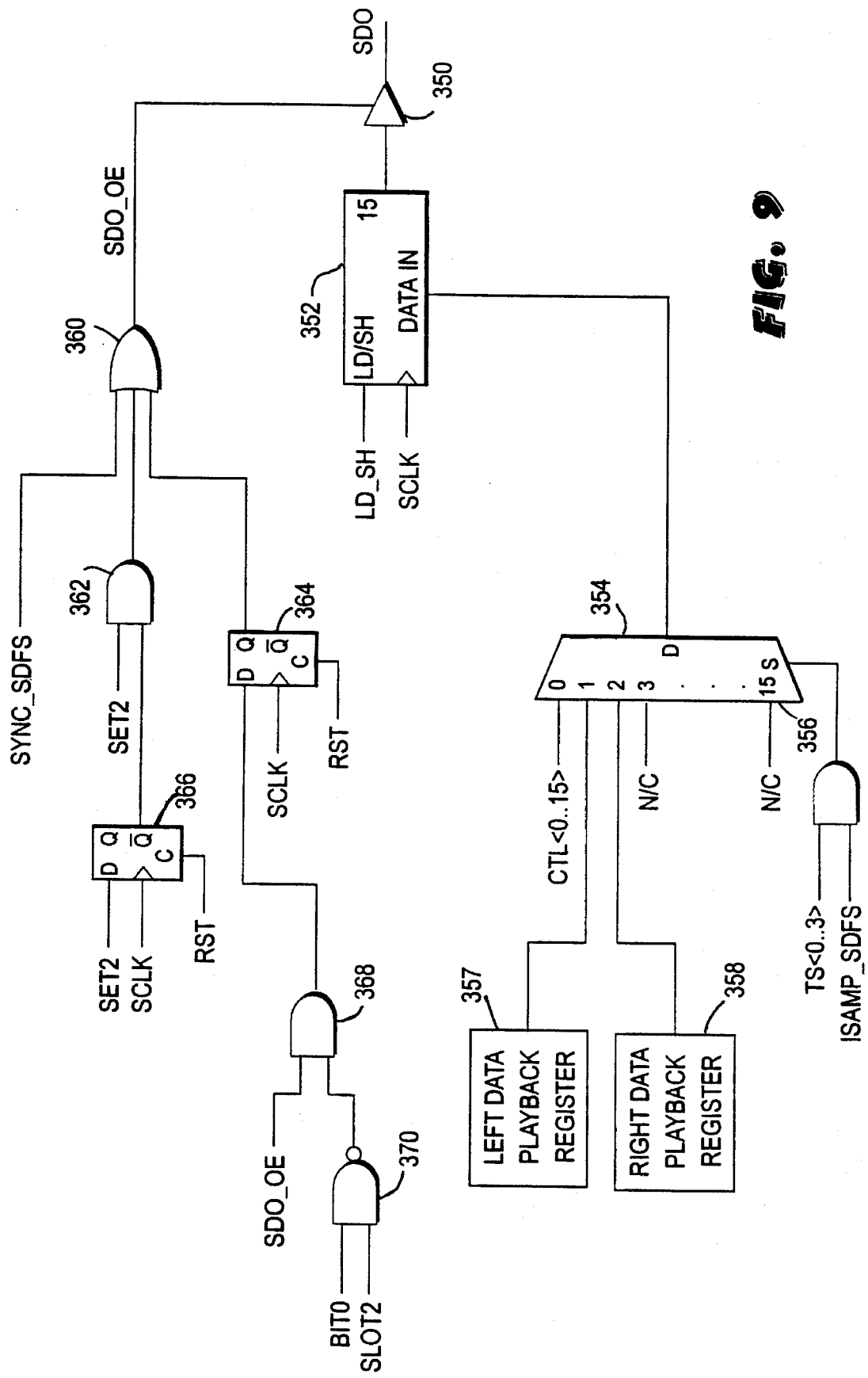
FIG. 9 is a schematic diagram of portions of the serial link output logic of the miscellaneous system logic chip for providing data to the CODEC.

FIG. 9 illustrates the data output channel of the serial channel logic 330. A tristate data buffer 350 provides the SDO or serial data output. The data input to the buffer 350 is provided by the most significant or 16th bit of a 16 bit shift register 352. The shift register 352 is clocked on the SCLK signal and receives a LD_SH signal at its load/shift input. When the LD_SH signal is high on the rising edge of the SCLK signal, the data present at the 16 parallel inputs of the shift register 352 are latched into the shift register 352. When the LD_SH signal is low, the data is shifted right on the rising edge of the SCLK signal. A 16 channel, 16 bit multiplexer 354 has its output connected to the 16 parallel inputs of the shift register 352. The select inputs of the multiplexer 354 are provided by the output of four AND gates 356. One input to the AND gates 356 is the !SAMP_SDFS or inverted version of the sampled SDFS signal. The second inputs of the AND gates 356 are the four bits TS<0 . . . 3> of the time slot counter 440 shown in FIG. 11. In this manner the 0 channel of the multiplexer 354 is selected when the SDFS signal is presented and at all other times the time slot counter 440 provides the selection of the multiplexer 354. The 0 input to the multiplexer 354 receives 16 signals which are referred to as the CTL signals, that is the output of the data register indicated by the top or zero entry in the FIFO queue. The development of these signals is described below. The 1 input to the multiplexer 354 receives the output of a left data playback register 356 while the 2 input receives the output of a right channel data playback register 358. The left and right data payback registers 356 and 358 are two of the registers in the audio data registers 328. The third through fifteenth inputs of the multiplexer 354 are unconnected to allow for future expansion.

The output enable input of the buffer 350 is provided by the output of an OR gate 360 whose inputs are the SYNC_SDFS or synchronized SDFS signal, the output of a two input AND gate 362 and the non-inverted output of a D-type flip-flop 364. The inputs to the AND gate 362 are the SET2 signal, which indicates that the second half or final 16 time slots of a 32 time slot frame are occurring, and the inverted output of a D-type flip-flop 366. The input to the flip-flop 366 is the SET2 signal, while the clock receives the SCLK signal and the clear input receives the RST or system reset signal. The D-type flip-flop 364 is clocked by the SCLK signal and cleared by the RST signal. The D input is provided by the output of a two input AND gate 368. The inputs to the AND gate 368 are the SDO_OE signal, which is the output of the OR gate 360, and the output of a two input AND gate 370. The inputs to the AND gate 370 are the SLOT2 and BIT0 signals, which indicate, respectively, that time SLOT2 is in progress and that BIT0, the least significant data bit, has been reached. In this manner data is provided from the buffer 350 only for time slots 0 to 2.

Figure 10:
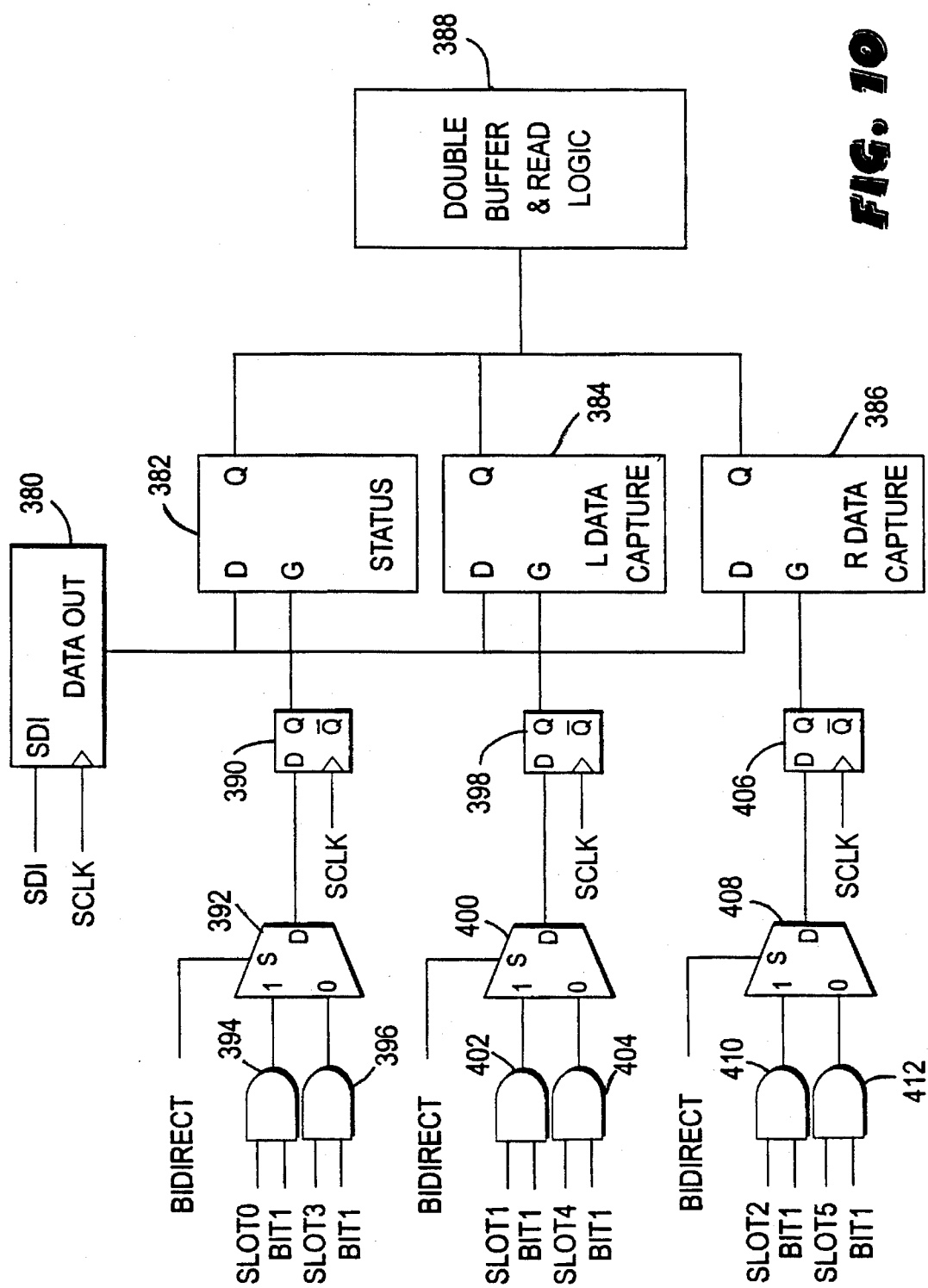
FIG. 10 is a schematic diagram of the serial link input logic of the miscellaneous system logic chip for receiving information from the CODEC.

FIG. 10 is a schematic diagram of the input circuitry of the serial channel logic 330. The SDI or serial data input signal is provided to the serial input of a 16 bit shift register 380 which is clocked on the falling edge of the SCLK signal. The 16 parallel outputs of the shift register 380 are provided to the D inputs of 16 bit latches 382, 384 and 386. The outputs of the latches 382, 384 and 386 are provided to double buffering and read logic 388 contained in the control registers 326 and the data registers 328. The double buffering logic has been omitted for clarity and simplicity. The register 382 is effectively the status register of the CODEC 152, while the registers 384 and 386 are effectively the left and right data capture registers in the audio data registers 328. The enable input of the register 382 is provided by the non-inverting output of a D-type flip-flop 390 whose D input is connected to the output of a two input multiplexer 392. A signal referred to as BIDIRECT or bidirectional transfer is used as the select input for the multiplexer 392. It is noted that in the preferred embodiment the SDI and SDO pins are connected together for unidirectional transfers only, but in an alternative embodiment, they can be cross-connected so that simultaneous transmission and reception can occur. This is referred to as the bidirectional capability. The 1 input of the multiplexer 392 is connected to the output of a two input AND gate 394 which receives the SLOT0 and BIT1 signals, to indicate that the next to the last bit of time slot 0 is active. The 0 input of the multiplexer 392 receives the output of a two input AND gate 396 whose inputs are the SLOT3 and BIT1 signals to indicate that the next to the last bit of the time slot 3 is occurring. The flip-flop 390 is clocked by the SCLK signal.

The enable input of the register 384 is connected to the non-inverting output of a D-type flip-flop 398, the flip-flop 398 being clocked by the SCLK signal. The D input to the flip-flop 398 is connected to the output of a two input multiplexer 400 which is selected by the BIDIRECT signal. The 1 input of the multiplexer 400 is connected to the output of a two input AND gate 402 which receives the SLOT1 and BIT1 signals. The 0 input of the multiplexer 400 is connected to the output of a two input AND gate 404 which receives the SLOT4 and BIT1 signals. The enable input of the register 386 is provided by the non-inverting output of a D-type flip-flop 406 which is clocked by the SCLK signal. The D input of the flip-flop 406 is connected to the output of a two input multiplexer 408 whose select input receives the BIDIRECT signal. The 1 input to the multiplexer 408 is connected to the output of a two input AND gate 410 which receives at its input the SLOT2 and BIT1 signals. The 0 input of the multiplexer 408 is connected to the output of a two input AND gate 412 which receives the SLOT5 and BIT1 signals at its inputs. Thus the latches 382, 384 and 386 appropriately are used to capture the received serial status and data at the appropriate time slots, in the preferred embodiment time slots 3, 4 and 5 in unidirectional mode.

FIG. 11 is a schematic diagram of the time slot logic utilized to determine the particular time slot. A four bit up counter 440 is clocked by the SCLK signal and is reset by the RST signal. The operation of the counter 440 is enabled by the BIT0 signal of the bit timer as shown in FIG. 12. The outputs of the counter 440 are the TS<0 . . . 3> signals and are provided to decode logic 442 to provide the SLOT0 to SLOT15 signals to indicate time slots 0 through 15 as appropriate to the count value of the counter 440.

The SET2 signal is provided at the non-inverting output of a D-type flip-flop 444 which is clocked by the SCLK signal and which is cleared by the RST signal. The D input of the flip-flop 444 is connected to the output of a two input multiplexer 446. The select input to the multiplexer 446 is the output of a two input AND gate 448 whose inputs are the SLOT15 and BIT0 signals to indicate the completion of 16 time slots. The 1 input of the multiplexer 446 is connected to the inverting output of the flip-flop 444, while the 0 input is connected to the SET2 signal. In this manner the SET2 signal is toggled every 16 time slots.

FIG. 12 illustrates the bit counter utilized to determine the particular bit position inside a given time slot. A 4 bit down counter 460 receives the SCLK signal at its clocking input and is reset by the RST signal. The 4 output bits of the counter 460 are provided to decode logic 462 to provide the BIT15 to BIT0 signals utilized to indicate bit positions. The enable input of the counter 460 is provided by the output of a two input OR gate 464. One input for the OR gate 464 is the !BIT15 or inverted BIT15 signal. The second input to the OR gate 464 is provided by the output of a two input AND gate 466 one of whose inputs is the BIT15 signal. The second input is provided by the output of a three input OR gate 468 whose inputs are the SNYC_SDFS signal, the !SLOT0 signal and the output of a two input AND gate 470. The inputs to the AND gate 470 are the SLOT0 signal and the SET 2 signal. In this manner the counter 460 counts in a downward fashion except during the period where the SDFS signal is being provided and after completion of a frame until a new SDFS signal is provided to start the next frame.

The SDFS signal is provided to the D input of a D-type flip-flop 472 (FIG. 13), the inverted clock input of the flip-flop 472 receiving the SCLK signal. The flip-flop 472 is reset by the RST signal. The non-inverted output of the D-type flip-flop 472 is the SAMP_SDFS signal, which is provided to the D input of a D-type flip-flop 474. The flip-flop 474 is clocked on the rising edge of the SCLK signal and is reset by the RST signal. The non-inverted output of the flip-flop 474 is the SYNC_SDFS signal. Thus the SAMP_SDFS signal is the SDFS signal sampled on the falling edge of the SCLK signal and the SYNC_SDFS signal is the synchronized version of the SDFS signal.

The 16 bits <15 . . . 0> of the CTL bus are illustrated in FIG. 14. The eight least significant bits are provided by the output of a 13 input, 8 bit multiplexer 500. The select control for the multiplexer 500 is provided by the QUE[0] value, that is, the data value contained in the top location of the FIFO queue which points to the control register at the top of the FIFO queue. The inputs to the multiplexer 500 are the outputs of the various control registers contained in the control register block 326. The double buffering logic associated with the control registers is not shown for clarity and simplicity. Bits 8–11 of the CTL signal are the QUE[0] signals, that is, the actual indexed address of the particular control register. Bit 12 is preferably set to a high level and is reserved for later operation. Bit 13 receives a QUE_RREQ signal, while bit 14 receives a QUE_MCE signal and bit 15 receives a QUE_CLOR signal. It is noted that the CLOR, MCE and RREQ signals are not utilized as directly provided to the miscellaneous system logic chip 132 but are tracked along with the appropriate entry in the FIFO queue as will be described below. The QUE_RREQ, QUE_MCE and QUE_CLOR are the tracked bits.

Figure 15:
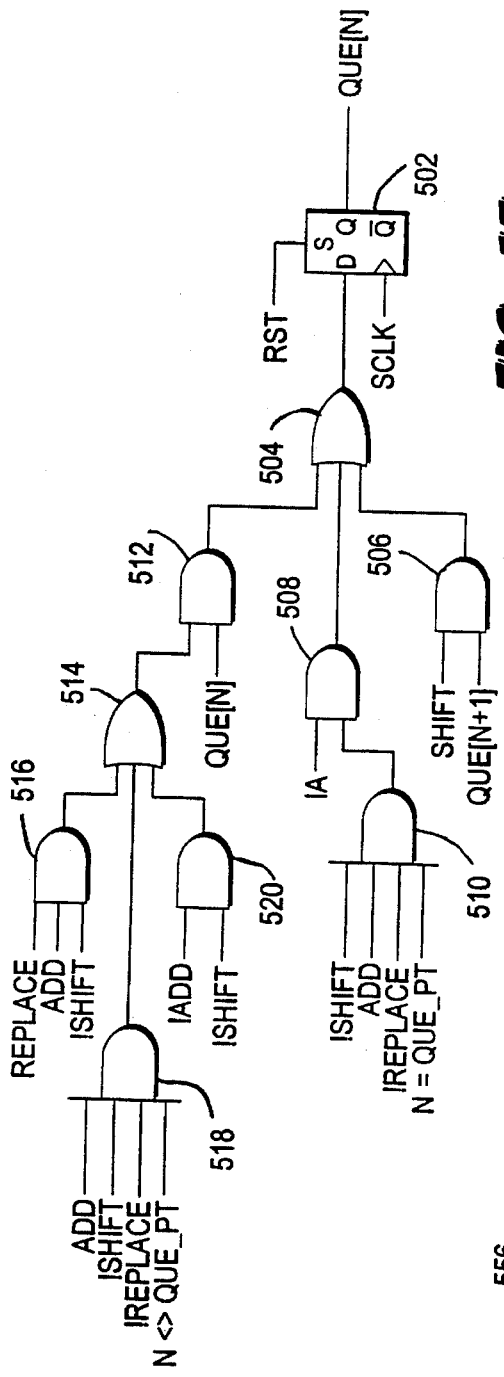
FIG. 15 is a schematic diagram of the control register FIFO queue logic.

The organization of the FIFO queue is shown in FIG. 15. It is noted that only a single entry in the FIFO queue is shown, but preferably there are 13 entries in the FIFO queue, to allow one for each control register. A single queue entry is shown for simplicity, with the value N referring to the particular number of the queue entry. Each queue entry is based on a 4 bit D-type flip-flop 502 to store the indexed address value of the control register. The FIFO queue stores index address values rather than the actual control register value to allow the control register data to be changed without requiring a new queue entry. The SCLK signal is provided to clock the flip-flop 502, while the RST signal sets the flip-flop 502 to an index address value of 15, which is a default dummy register in the preferred embodiment. The non-inverted outputs of the flip-flop 502 are referred to as the QUE[N] signals, where N is 0 to 12 in the preferred embodiment. The D inputs receive the outputs of four three input OR gates 504.

One input to the OR gates 504 is provided by the outputs of four AND gates 506. One input to the AND gates 506 is the QUE[N+1] signals or signal from the next lower queue entry, while the second input is a signal referred to as SHIFT, which is used to indicate a shift in the values in the FIFO queue. The second input to the OR gates 504 is provided by the outputs of four two input gates 508. One set of inputs to the AND gates 508 is the IA or index address value, which is the value that is placed in the particular queue entry to indicate the index address of the control register being written to by the microprocessor. The second input to the AND gates 508 is provided by the output of a four input AND gate 510. The inputs to the AND gate 510 are the !SHIFT signal to indicate that a shift is not occurring, an ADD signal which indicates that an entry is being added, an !REPLACE signal to indicate that an entry is not being replaced and a signal to indicate that the QUE_PT or queue pointer value is equal to N, that is the particular queue entry flip-flops 502 of interest. A queue pointer is used to indicate the location of the next entry into the FIFO queue. This input to the OR gates 504 is used to place a new index address value into the queue as indicated by the use of the IA signals. The final input to the OR gates 504 is provided by the outputs of four two input AND gates 512. One input to the AND gates 512 is the QUE[N] signals, while the second input is provided by the output of a three input OR gate 514. The inputs to the OR gate 514 are provided by the outputs of a three input AND gate 516, which receives at its inputs the !SHIFT, ADD and REPLACE signals to indicate that a replace operation is occurring; the output of a four input AND gate 518, which receives at its inputs the !SHIFT, ADD and !REPLACE signals and a signal indicating that the QUE_PT value is not equal to N for the case where an entry is added at other than the queue entry; and the final input is provided by the output of a two input AND gate 520 which receives at its inputs the !ADD and !SHIFT signals to indicate that neither an add nor a shift is occurring.

Therefore the values in the particular queue entries are the index address for the particular control register, not the actual data which is contained in the control register. That data remains in the control register. In this manner a control register can be rewritten and its queue or entry location in the FIFO queue is not lost.

Figure 16:
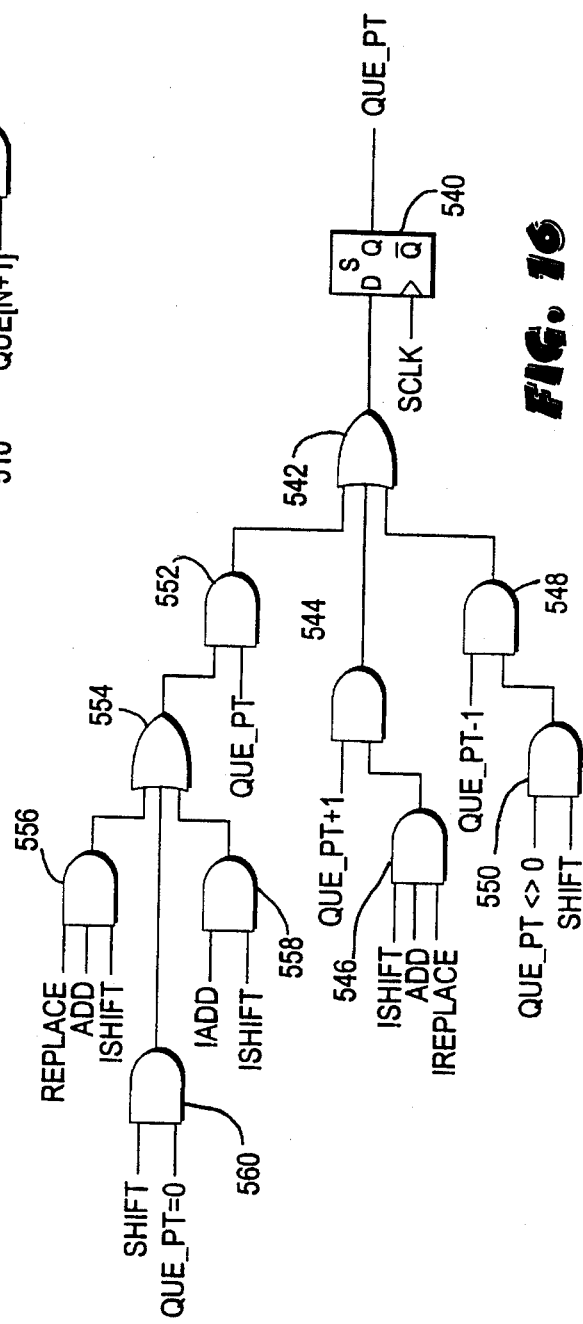

The QUE_PT signals are provided at the output of four D-type flip-flops 540 (FIG. 16) which are clocked by the SCLK signal and whose D inputs are connected to the output of four three input OR gates 542. One input to the OR gates 542 is provided by the output of four AND gates 544 which receive at one input the QUE_PT value plus 1, while the other input receives the output of a three input AND gate 546 which receives as its inputs the ADD, !REPLACE and !SHIFT signals. The AND gate 544 thus increments the QUE_PT value when an entry is added to the queue. The second input to the OR gates 542 is provided by the outputs of four two input AND gates 548 which receives at one input the QUE_PT value minus one and at the second input receives the output of a two input AND gate 550 which receives at its inputs the SHIFT signal and a signal indicating that the QUE_PT value is not equal to 0. Thus AND gate 548 is used to decrement the QUE_PT value when an entry has been transferred to the CODEC 162 and the queue is being shifted. The third input to the OR gate 542 is provided by the outputs of four two input AND gates 552 which receive at one input the QUE_PT value and at the other input the output of a three input OR gate 554. One input to the OR gate 554 is provided by the output of a three input AND gate 556 which receives the ADD, !SHIFT and REPLACE signals. The second input to the OR gate 554 is provided by the output of a two input AND gate 558 which receives at its inputs the !ADD and !SHIFT signals. The final input to the OR gate 554 is provided by the output of a two input AND gate 560 which receives at its inputs the SHIFT signal and a signal indicating that the QUE_PT signal is equal to 0. Thus the AND gate 552 maintains the QUE_PT value during replace operations and when the queue is empty.

The LD_SH signal is produced by the output of a two input OR gate 600 (FIG. 17) which receives as its inputs the SAMP_SDFS signal and the BIT0 signal. The SHIFT signal is produced at the output of a two input OR gate 602 which receives as its inputs the SAMP_SDFS signal and the output of a four input AND gate 604. The input to the 604 are the !SET2 signal, a signal referred to as !FRS which indicates that a 32 slot frame size is selected, the BIT0 signal and the SLOT15 signal. Thus the AND gate 604 is used to shift the queue on 16 slot frame cases. The REPLACE signal is provided at the output of a 13 input OR gate 606 which receives at its inputs the REPL<0 . . . 12> signals. The REPL signals are provided by the equal output of 13 comparators 606. The A input of the comparators 606 receives the QUE[N] signals and the B input receives the IA or index address signal. In this manner the comparators 606 indicate if the particular register address value is already present in the FIFO queue and thus the write operation is a replacement, not an addition. If none are present then it is an addition operation.

Figure 18:
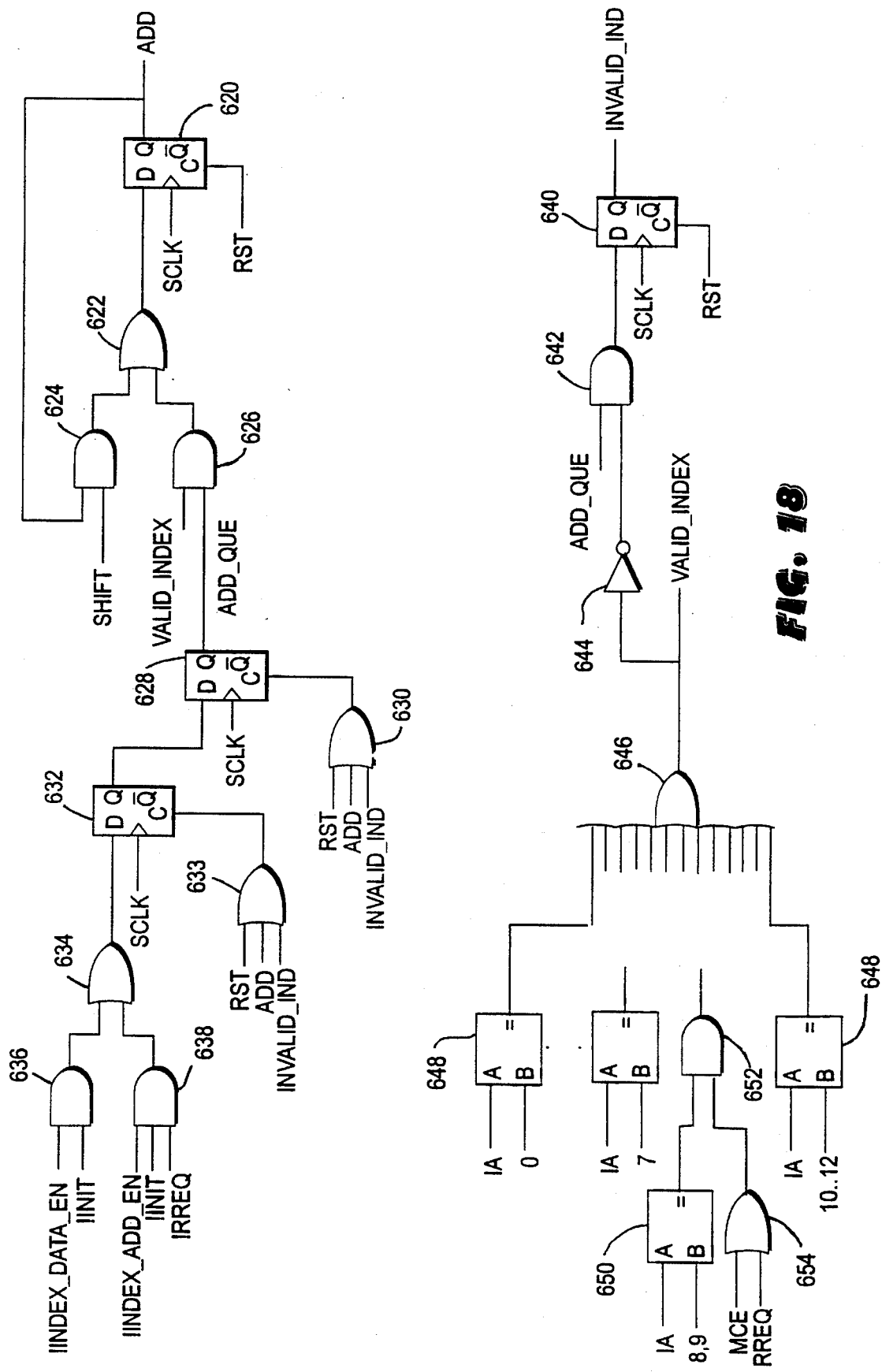

The ADD signal provided at the non-inverted output of a D-type flip-flop 620 (FIG. 18), with the flip-flop 620 being clocked by the SCLK signal and cleared by the RST signal. The D input of the flip-flop 620 is connected to the output of a two input OR gate 622. One input to the OR gate 622 is provided by the output of a two input AND gate 624 which receives at one input the ADD signal and at the other input the SHIFT signal. The second input to the OR gate 622 is provided by the output of a two input AND gate 628 which receives a signal referred to as ADD_QUE and a signal referred to as VALID_INDEX. The ADD_QUE signal is provided at the non-inverted output of a D-type flip-flop 628 which is clocked by the SCLK signal. The flip-flop 628 is cleared by a signal which is the output of a three input OR gate 630 which has inputs of the RST signal, the ADD signal and an INVALID_IND signal, which indicates that an invalid index address has been received. The D input to the flip-flop 628 is provided by the non-inverting output of a D-type flip-flop 632 which is clocked by the IOWC* signal provided on the EISA bus E and is cleared by the output of a three input OR gate 633 which receives the RST, ADD and INVALID_IND signals. The D input of the flip-flop 632 is provided by the output of a two input OR gate 634. One input to the OR gate 634 is provided by the output of a two input AND gate 632 which receives the INDEX_DATA_EN signal, which is a strobe signal indicating the valid portion of a write to the index data port of the system logic chip 132, and the !INIT signal, which is an inverted version of a signal indication initialization of the digital interface logic either on reset or on command. The second input to the OR gate 634 is provided by the output of a three input AND gate 638 which receives the INDEX_ADD_EN signal, which is a strobe signal indicating the valid portion of a write to the index address port of the system logic chip 132, the !INIT signal and the RREQ signal.

The INVALID_IND signal is provided at the non-inverted output of a D-type flip-flop 640 which is clocked by the SCLK signal and cleared by the RST signal. The D input of the flip-flop 640 is connected to the output of a two input AND gate 642 which receives the ADD_QUE signal at one input and the output of an inverter 644 at the second input. The input to the inverter 644 is the VALID_INDEX signal which is provided at the output of a 13 input OR gate 646. A series of comparators 648 which receive at their A input the IA signal and at their B inputs the values 0 to 7 and 10, 11 and 12. The equal outputs of the comparators 648 indicate the selection of those particular control registers and are provided to the OR gate 646. Comparators 650 are similarly provided for index addresses of control registers 8 and 9 except that the equal output of the comparators 650 are provided as one input to two input AND gates 652 whose second inputs are provided by the output of an OR gate 654 which receives the MCE and RREQ signals from the index address port of the system miscellaneous logic chip 132. The outputs of the AND gate 652 are the remaining inputs to the OR gate 646.

Figure 19:
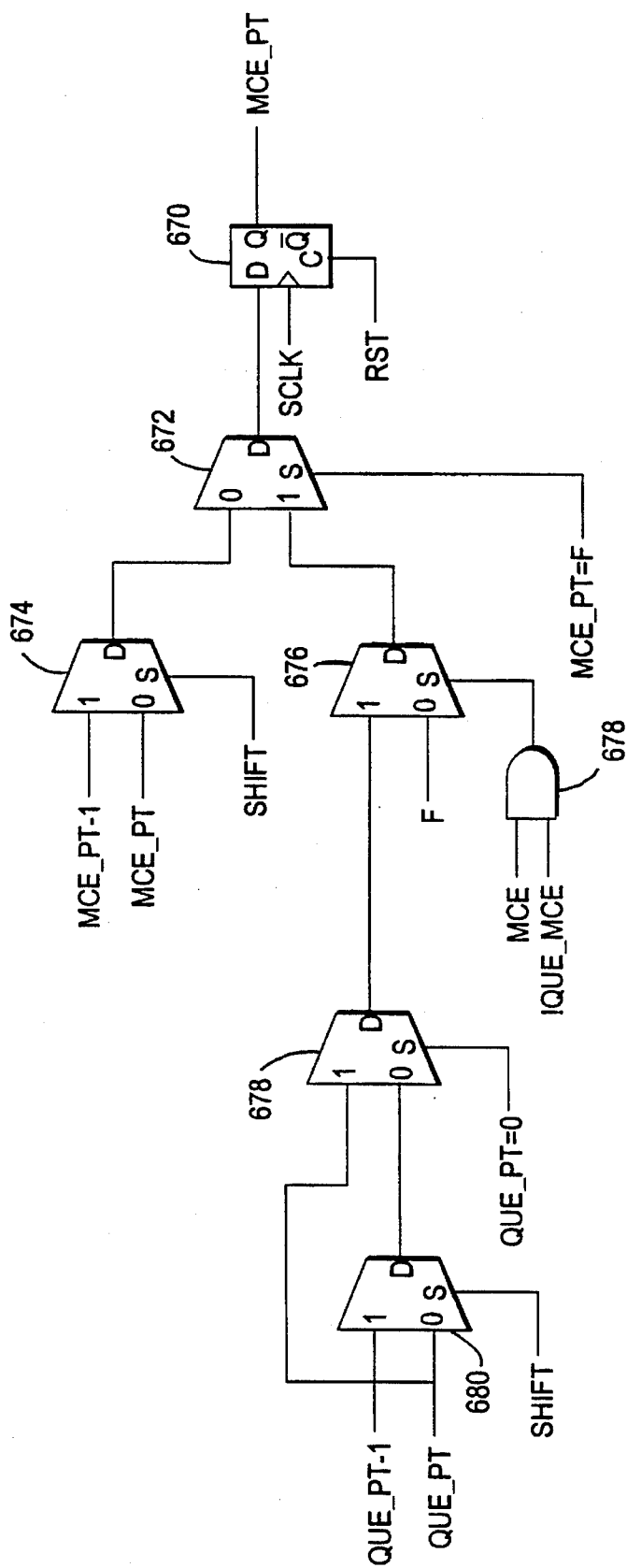

Referring now to FIG. 19, the QUE_MCE signal is provided by the non-inverted output of a D-type flip-flop 660 which is clocked by the SCLK signal and which is preset by the RST signal. The D input to the flip-flop 660 is provided by the output of a two input multiplexer 662 which is a high or one value connected to the 1 input and whose selection is provided by a signal indicating that a value referred to as MCE_PT equals 0. The MCE_PT value is the location in the FIFO queue of the entry operation writing the MCE bit. The 0 input of the multiplexer 662 is provided by the output of a two input AND gate 664, with one input to the AND gate 664 being the QUE_MCE signal. The second input is provided by the output of a two input NAND gate 666 whose inputs are the !MCE signal provided from the index address port and a signal indicating that the QUE_PT value is equal to 0.

The MCE_PT values are provided at the non-inverting output of a four bit D-type flip-flop 670 which is clocked by the SCLK signal and cleared by the RST signal. The D inputs from flip-flop 670 are provided by the output of the four bit, two input multiplexer 672 which receives as a selection signal a signal indicating that the MCE_PT value is equal to F. The 0 input to the multiplexer 672 is connected to the output of a four bit, two input multiplexer 674 selection of which is controlled by the SHIFT signal. The one input to the multiplexer 674 receives the MCE_PT value minus one while the 0 input receives the MCE_PT value. The 1 input to the multiplexer 672 is provided by the output of a four bit, two input multiplexer 676. Selection of the multiplexer 676 is provided by the output of a two input AND gate 678 which receives the MCE and !QUE_MCE signals. The 0 input to the multiplexer 676 receives an F or all high values, while the 1 input is connected to the output of a four bit, two input multiplexer 678. The multiplexer 678 has its input selection done by value indicating that the QUE_PT signal is equal to 0. The 1 input is connected to the QUE_PT signals while the 0 input is connected to the output of a four bit, two input multiplexer 680. The multiplexer 680 is selected by the SHIFT signal and has its 1 inputs connected to the QUE_PT value minus one while the 0 input receives the QUE_PT value. Therefore the MCE value tracks the entry in the FIFO queue in which it was written.

Figure 20:
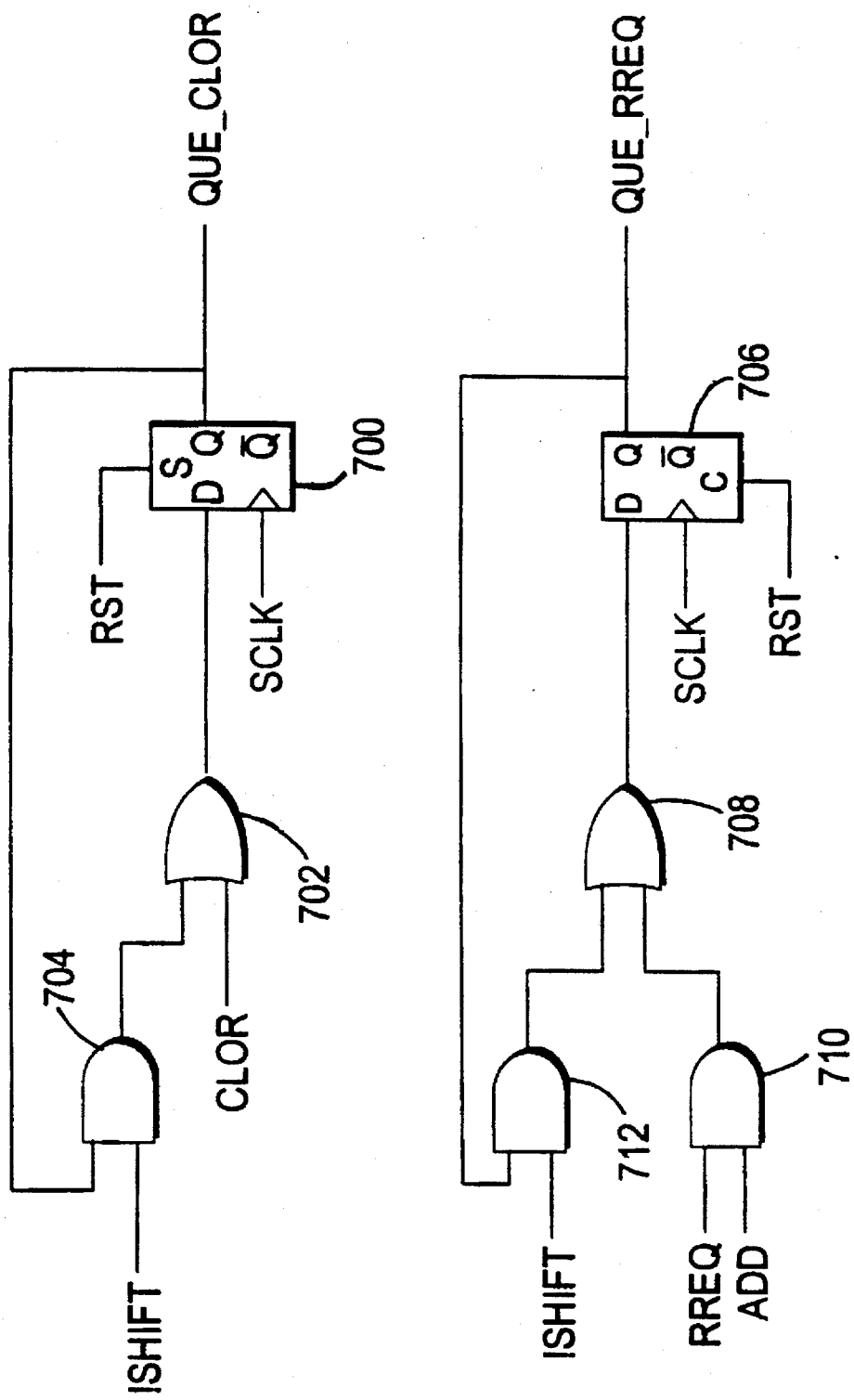

Referring now to FIG. 20 the QUE_CLOR signal is produced at the non-inverted output of a D-type flip-flop 700 which is clocked by the SCLK signal and which is preset by the RST signal. The D input to the flip-flop 700 is connected to the output of a two input OR gate 702 which receives at one input the CLOR bit provided in the index address port and at the second input the output of a two input AND gate 704. The two inputs to the AND gate 704 are the QUE_CLOR signal and the !SHIFT signal. Thus the QUE_CLOR signal is set when the CLOR bit is written to the appropriate control register and clears after the CLOR bit has been cleared and a shift has occurred in the FIFO queue.

The QUE_RREQ signal is provided at the non-inverted output of a D-type flip-flop 706 which is clocked by the SCLK signal and whose clear input is the RST signal. The D input of the flip-flop 706 is connected to the output of the two input OR gate 708. One input to the OR gate 708 is provided by the output of a two input AND gate 710 which receives at one end the RREQ signal from the index address port and at the other input receives the ADD signal. The second input to the OR gate 708 is provided by a two input AND gate 712 which receives at one input the QUE_RREQ signal and at the second input receives the !SHIFT signal. Thus the QUE_RREQ signal is set when a write operation to set the desired control register index address occurs after the RREQ bit has been set in the appropriate control register and clears when the RREQ bit has been cleared and a shift has occurred in the FIFO queue.

The CODEC 162 has serial data receiving and transmitting logic similar to that of the system logic chip 132, except that the FIFO queue logic is not provided as the CODEC 162 only receives control information. The control information is provided to the proper internal control register based on the index address value provided in the control word, so that a second set of latching logic is provided for the control registers. Details are not provided for simplicity, it being understood that one skilled in the art can readily develop the companion logic in the CODEC 162 based on this disclosure of the circuitry in the system logic chip 132.

Reviewing then the operation of the serial channel logic 330, assume a series of write operations to the control registers 0, 1, 2, 4 and 1. The FIFO queue then contains index address entries of 0, 1, 2, and 4. The second write operation to register 1 is not placed in the FIFO queue but rather just replaces the actual value in register 1.

The data provided in the second write operation to register 1 occurs out of absolute time order, but because the time between frames is only 2.08 msec, the effective advancement of 6.25 msec is inaudible. Indeed, even the worst case advancement of 25 msec is inaudible. Yet the effective transfer rate of the control information has increased without actually increasing the frame rate. Thus slower serial link L is able to keep up with the control information transfer rate of the EISA bus E. Thus a slower serial link can be used, saving cost and pin count, without sacrificing audible performance.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A circuit for transferring data from a first device to a second device, wherein the first device performs a write operation to transfer data, the circuit comprising:

a plurality of registers addressable by the first device for storing data to be transferred from the first device to the second device;

a write operation detection circuit detecting a write operation to one of said plurality of registers;

a storage response circuit operable in response to said write operation detection circuit and storing the data of a detected write operation to said one of said plurality of registers;

a FIFO queue for storing addresses of said plurality of registers;

an address determination circuit coupled to said FIFO queue for determining if the address of one of said plurality of registers is stored in said FIFO queue;

an address addition circuit responsive to said address determination circuit and said write operation detection circuit, said address addition circuit adding the address of said one of said plurality of registers to said FIFO queue if said address is not stored in said FIFO queue when said write operation is detected, and not adding the address of said one of said plurality of registers to said FIFO queue if said address is stored in said FIFO queue when said write operation is detected;

a data provision circuit coupled to said plurality of registers and said FIFO queue;

said data provision circuit providing the data from a register, indicated among by the register address at the top of said FIFO queues, to the second device;

said data provision circuit also shifting said addresses stored in said FIFO queue when said data is provided;

said data provision circuit further performing a parallel to serial conversion of said data; and a time multiplexed serial link connected to the second device, said time multiplexed serial link having a plurality of time slots, one of said time slots being a designated time slot to receive data from said plurality of registers; and said data provision circuit performing said parallel to serial conversion during said designated time slot of said time multiplexed serial link.

2. A computer system comprising:

a microprocessor for performing data write operations to particular register addresses;

a parallel bus coupled to said microprocessor for transferring said data and addresses of said write operations;

a device for receiving data provided by said microprocessor during write operations;

a communications link coupled to said device for transferring data of said operations to said device;

a data transfer circuit, said data transfer circuit including:

a plurality of registers addressable by said microprocessor for storing data to be transferred from said microprocessor to said device;

a write operation detection circuit detecting a write operation to one of said plurality of registers;

a storage response circuit operable in response to said write operation detection circuit and storing the data of a detected write operation to said one of said plurality of registers;

a FIFO queue for storing addresses of said plurality of registers;

an address determination circuit coupled to said FIFO queue for determining if the address of one of said plurality of registers is stored in said FIFO queue;

an address addition circuit responsive to said address determination circuit and said write operation detection circuit, said address addition circuit adding the address of said one of said plurality of registers to said FIFO queue if said address is not stored in said FIFO queue when said write operation is detected, and not adding the address of said one of said plurality of registers to said FIFO queue if said address is stored in said FIFO queue when said write operation is detected; and a data provision circuit coupled to said plurality of registers and said FIFO queue;

said data provision circuit providing the data from a register, indicated by the address at the top of said FIFO queue to said device;

said data provision circuit also shifting said addresses stored in said FIFO queue when said data is provided;

said data provision circuit further performing a parallel to serial conversion of said data; and said communications link comprising a time multiplexed serial link connecting said data transfer circuit to said device, and for transferring said data write operations to said device, said time multiplexed serial link having a plurality of time slots, one of said time slots being a designated time slot to receive data from said plurality of registers; and said data provision circuit performing said parallel to serial conversion during said designated time slot of said time multiplexed serial link.

3. A computer system comprising:

a microprocessor for performing data write operations to particular register addresses;

a parallel bus coupled to said microprocessor for transferring said data and addresses of said write operations;

a CODEC for receiving data provided by said microprocessor during write operations;

a communications link coupled to said CODEC for transferring said data of said write operations to said CODEC;

a data transfer circuit, said data transfer circuit including:

a plurality of registers addressable by said microprocessor for storing data to be transferred from said microprocessor to said CODEC;

a write operation detection circuit detecting a write operation to one of said plurality of registers;

a storage response circuit operable in response to said write operation circuit and storing the data of a detected write operation to said one of said plurality of registers;

a FIFO queue for storing addresses of said plurality of registers;

an address determination circuit coupled to said FIFO queue for determining if the address of one of said plurality of registers is stored in said FIFO queue;

an address addition circuit responsive to said address determination circuit and said write operation detection circuit, said address addition circuit adding the address of said one of said plurality of registers to said FIFO queue if said address is not stored in said FIFO queue when said write operation is detected, and not adding the address of said one of said plurality of registers to said FIFO queue if said address is stored in said FIFO queue when said write operation is detected; and a data provision circuit coupled to said plurality of registers and said FIFO queue;

said data provision circuit providing the data from the register, indicated by the address at the top of said FIFO queue, to said CODEC;

said data provision circuit also shifting said addresses stored in said FIFO queue when said data is provided;

said CODEC including a plurality of registers corresponding to said plurality of registers in said data transfer circuit;

the data in said plurality of registers in said transfer circuit controlling operation of said CODEC; and said communications link further transferring the address of said register containing said data of said write operations to said CODEC from said microprocessor.

4. The computer system of claim 3, wherein certain of said plurality of registers in said device can be write protected, wherein said microprocessor can write data removing said write protection on any write operation to said plurality of registers in said data transfer circuit and wherein said write protection removal data is provided in the proper time frame with respect to addresses in said FIFO queue.

5. A computer system comprising:

a microprocessor for performing data write operations to particular register addresses;

a parallel bus coupled to said microprocessor for transferring said data and addresses of said write operations;

a CODEC for receiving data provided by said microprocessor during write operations;

a communications link coupled to said CODEC for transferring said data of said write operations to said device; and a data transfer circuit, said data transfer circuit including:

a plurality of registers addressable by said microprocessor for storing data to be transferred from said microprocessor to said CODEC to control operation of said CODEC;

a write operation detection circuit detecting a write operation to one of said plurality of registers;

a storage response circuit operable in response to said write operation detection circuit storing the data of a detected write operation to said one of said plurality of registers;

a FIFO queue for storing addresses of said plurality of registers;

an address determination circuit coupled to said FIFO queue for determining if the address of one of said plurality of registers is stored in said FIFO queue;

an address addition circuit responsive to said address determination circuit and said write operation detection circuit, said address addition circuit adding the address of said one of said plurality of registers to said FIFO queue if said address is not stored in said FIFO queue when said write operation is detected, and not adding the address of said one of said plurality of registers to said FIFO queue if said address is stored in said FIFO queue when said write operation is detected; and a data provision circuit coupled to said plurality of registers and said FIFO queue;

said data provision circuit providing the data from the register, indicated by the address at the top of said FIFO queue, to said device;

said data provision circuit also shifting said addresses stored in said FIFO queue when said data is provided.

6. A method for transferring data by a time multiplexed serial link from a first device to a second device using a FIFO queue for storing addresses of a plurality of registers addressable by the first device, wherein the first device performs a write operation to one of the plurality of registers, the plurality of registers storing data to be transferred from the first device to the second device, the method comprising the steps of:

detecting a write operation from the first device to one of the plurality of registers;

storing the data of said write operation to said one of the plurality of registers;

determining if the address of said one of the plurality of registers is stored in the FIFO queue;

adding the address of said one of the plurality of registers to the FIFO queue if said address is not stored in the FIFO queue when said write operation is detected;

not adding the address of said one of the plurality of registers to the FIFO queue if said address is stored in the FIFO queue when said write operation is detected; and providing the data from the register of the plurality of registers indicated by the address at the top of the FIFO queue to the second device and shifting said addresses stored in the FIFO queue when said data is provided;

performing parallel to serial conversion of said data during said step of providing it;

wherein the time multiplexed serial link has a plurality of time slots, one of said time slots designated to receive data from said plurality of registers and wherein said step of performing parallel to serial conversion occurs during said designated time slot.

7. The method of claim 6, wherein the second device includes a plurality of registers corresponding to the plurality of registers written to by the first device and wherein said communications link further transfers the address of said one register.

8. The method of claim 7, wherein the second device is a CODEC and the data in the plurality of registers controls operation of said CODEC.

9. A circuit for transferring data from a first device to a CODEC, wherein the first device performs a write operation to transfer data, the circuit comprising:

a plurality of registers addressable by the first device for storing data to be transferred from the first device to the CODEC to control the operation of the CODEC;

a write operation detection circuit detecting a write operation to one of said plurality of registers;

a storage response circuit operable in response to said write operation circuit and storing the data of a detected write operation to said one of said plurality of registers;

a FIFO queue for storing addresses of said plurality of registers;

an address determination circuit coupled to said FIFO queue for determining if the address of one of said plurality of registers is stored in said FIFO queue;

an address addition circuit responsive to said address determination circuit and said write operation detection circuit, said address addition circuit adding the address of said one of said plurality of registers to said FIFO queue if said address is not stored in said FIFO queue when said write operation is detected, and not adding the address of said one of said plurality of registers to said FIFO queue if said address is stored in said FIFO queue when said write operation is detected;

a data provision circuit coupled to said plurality of registers and said FIFO queue;

said data provision circuit providing the data from a register, indicated by the register address at the top of said FIFO queue, to the CODEC;

said data provision circuit also shifting said addresses stored in said FIFO queue when said data is provided.

* * * * *